United States Patent
Enomoto

(10) Patent No.: US 9,696,530 B2
(45) Date of Patent: Jul. 4, 2017

(54) ZOOM LENS SYSTEM

(71) Applicant: RICOH IMAGING COMPANY, LTD., Tokyo (JP)

(72) Inventor: Takashi Enomoto, Chiba (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 69 days.

(21) Appl. No.: 14/058,644

(22) Filed: Oct. 21, 2013

(65) Prior Publication Data
US 2014/0118840 A1    May 1, 2014

(30) Foreign Application Priority Data
Oct. 25, 2012 (JP) ................. 2012-235240

(51) Int. Cl.
*G02B 15/14* (2006.01)
*G02B 9/34* (2006.01)
(Continued)

(52) U.S. Cl.
CPC .......... *G02B 15/22* (2013.01); *G02B 15/173* (2013.01); *G02B 15/177* (2013.01); *G02B 5/005* (2013.01);
(Continued)

(58) Field of Classification Search
CPC  G02B 15/173; G02B 27/646; G02B 13/0045; G02B 13/18; G02B 13/009;
(Continued)

(56) References Cited

U.S. PATENT DOCUMENTS 3,912,376 A    10/1975  Ogura et al.
4,124,274 A *  11/1978  Tanaka .................. G02B 15/22
                                                    359/684
(Continued)

FOREIGN PATENT DOCUMENTS

EP    2144108    1/2010
GB    2246879    2/1992
(Continued)

OTHER PUBLICATIONS

EPO Office action, mail date is Feb. 18, 2014.
(Continued)

*Primary Examiner* — Evelyn A Lester
(74) *Attorney, Agent, or Firm* — Greenblum & Bernstein, P.L.C.

(57) ABSTRACT

A zoom lens system includes a plurality of lens groups, a lens group of which is moved to perform zooming, wherein a specified lens group of the lens groups is a focusing lens group; a normal photography mode in which focusing is carried out from infinity to a predetermined photographing distance by moving the focusing lens group of the specified lens group; and a shifting mode which shifts from the normal photography mode to a macro photography mode by moving a lens element of the specified lens group other than the focusing lens group when focusing on an object at a photographing distance that is shorter than the predetermined photographing distance. When the zoom lens system is in the macro photography mode, focusing is carried out from the predetermined photographing distance to a minimum photographing distance by moving the focusing lens group.

14 Claims, 30 Drawing Sheets

(51) Int. Cl.
- *G02B 15/22* (2006.01)
- *G02B 15/173* (2006.01)
- *G02B 15/177* (2006.01)
- *G02B 5/00* (2006.01)
- *G02B 7/10* (2006.01)
- *G02B 13/00* (2006.01)
- *G02B 13/18* (2006.01)
- *G02B 15/163* (2006.01)
- *G02B 15/167* (2006.01)
- *G02B 15/20* (2006.01)
- *G02B 27/64* (2006.01)
- *G03B 3/00* (2006.01)
- *G03B 13/32* (2006.01)

(52) U.S. Cl.
CPC ............ *G02B 7/10* (2013.01); *G02B 9/34* (2013.01); *G02B 13/009* (2013.01); *G02B 13/0045* (2013.01); *G02B 13/18* (2013.01); *G02B 15/14* (2013.01); *G02B 15/163* (2013.01); *G02B 15/167* (2013.01); *G02B 15/20* (2013.01); *G02B 27/646* (2013.01); *G03B 3/00* (2013.01); *G03B 13/32* (2013.01); *G03B 2205/0046* (2013.01)

(58) Field of Classification Search
CPC ...... G02B 15/20; G02B 15/14; G02B 15/163; G02B 9/34; G02B 5/005; G02B 15/22; G02B 7/10; G02B 15/167; G03B 2205/0046; G03B 13/32; G03B 3/00

USPC .................. 359/687, 684, 685, 740, 774
See application file for complete search history.

(56) References Cited

U.S. PATENT DOCUMENTS

| | | |
|---|---|---|
| 6,002,528 A | 12/1999 | Tomita |
| 6,246,833 B1 | 6/2001 | Harada |
| 6,353,506 B1 | 3/2002 | Ohashi |
| 7,336,429 B2 * | 2/2008 | Shibayama ......... G02B 15/173 359/684 |
| 2012/0147251 A1 | 6/2012 | Matsuzawa et al. |

FOREIGN PATENT DOCUMENTS

| | | |
|---|---|---|
| JP | 02-020131 | 1/1990 |
| JP | 02-201310 | 8/1990 |
| JP | 06-027380 | 2/1994 |
| JP | 3445095 | 9/2003 |
| JP | 3710277 | 10/2005 |
| JP | 2012-123340 | 6/2012 |

OTHER PUBLICATIONS

Search report from European Patent Office (EPO), mail date is Jun. 13, 2014.

Office Action in corresponding European Application dated Jun. 24, 2016.

* cited by examiner

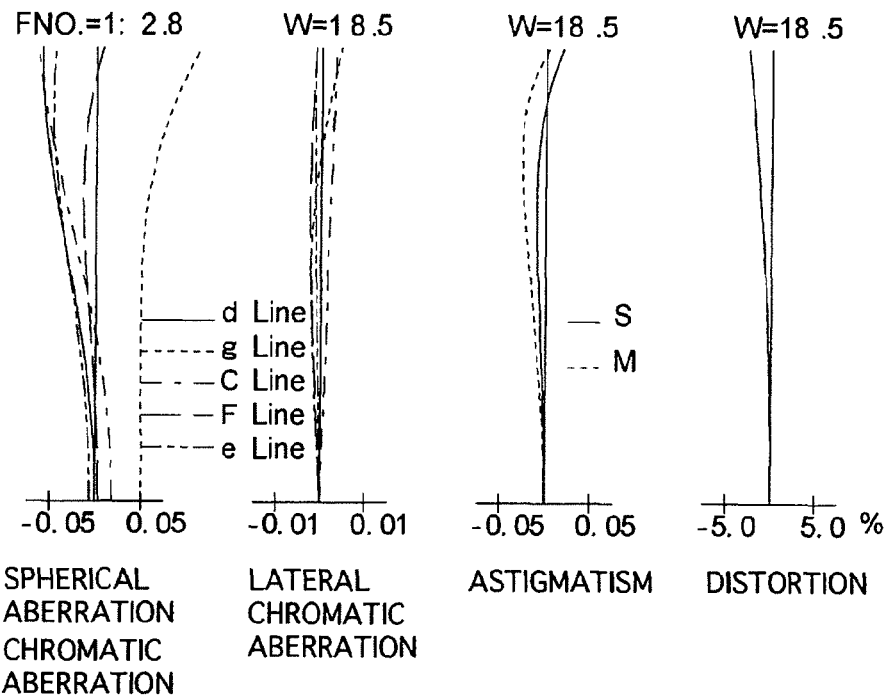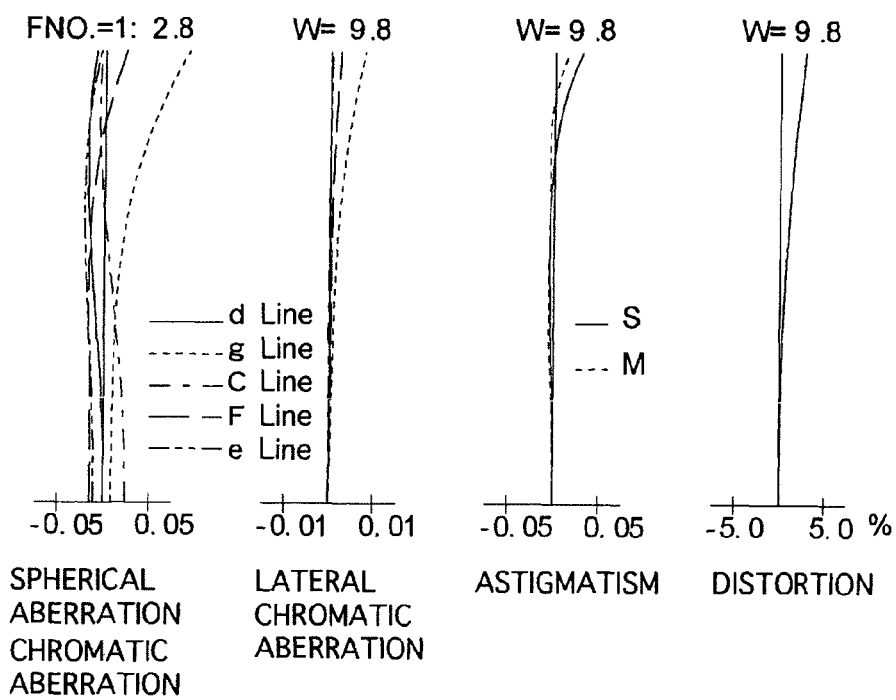

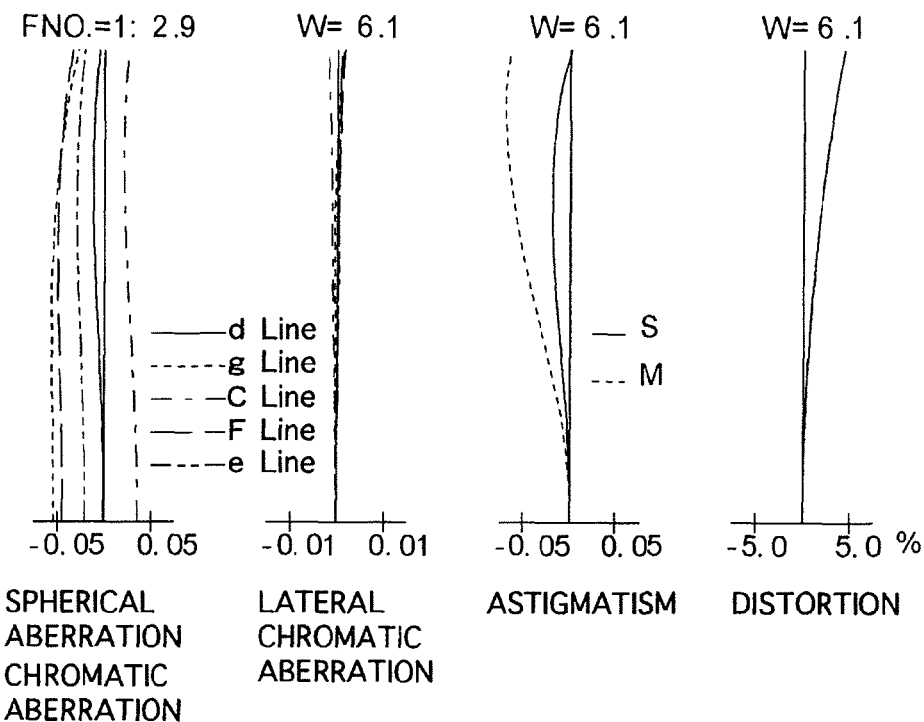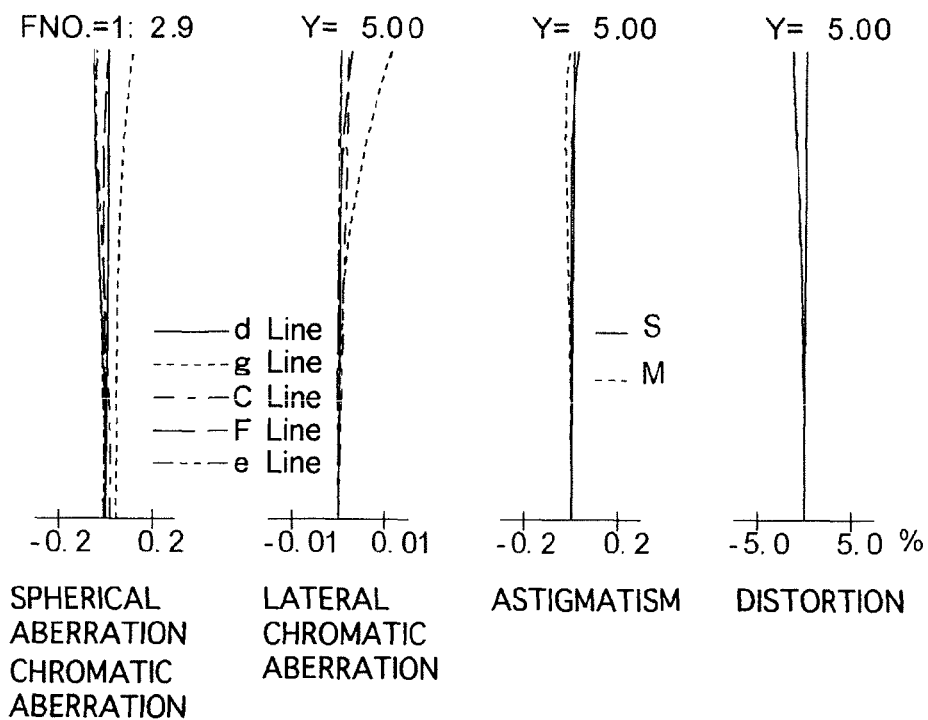

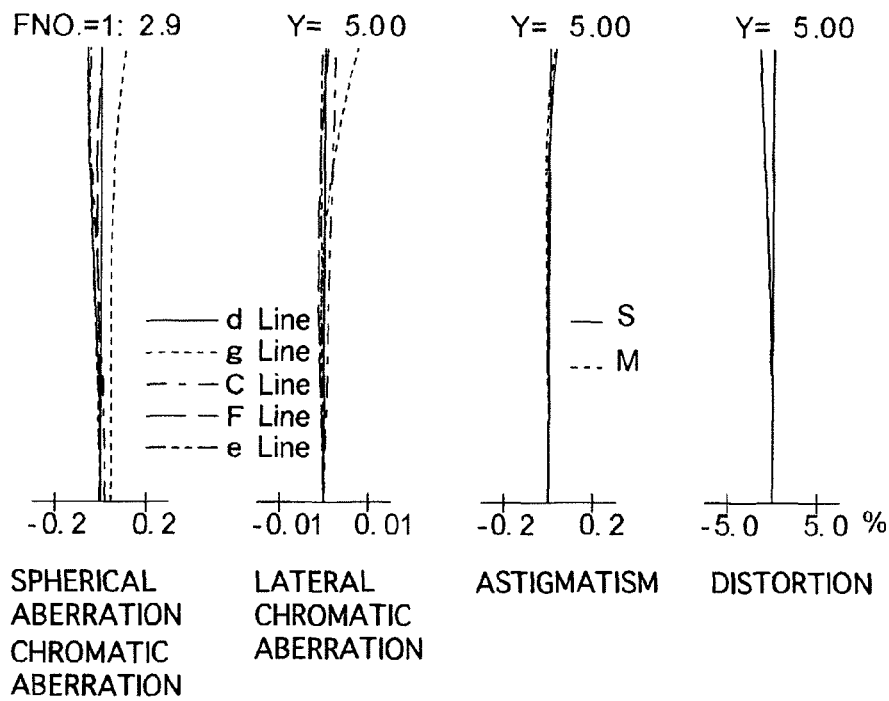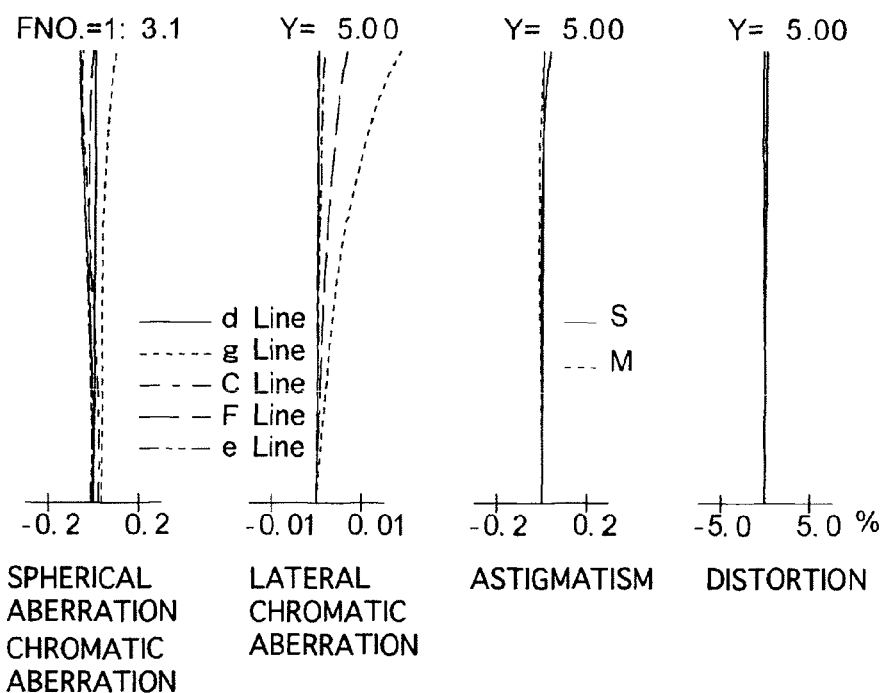

SPHERICAL ABERRATION CHROMATIC ABERRATION | LATERAL CHROMATIC ABERRATION | ASTIGMATISM | DISTORTION

SPHERICAL ABERRATION CHROMATIC ABERRATION | LATERAL CHROMATIC ABERRATION | ASTIGMATISM | DISTORTION

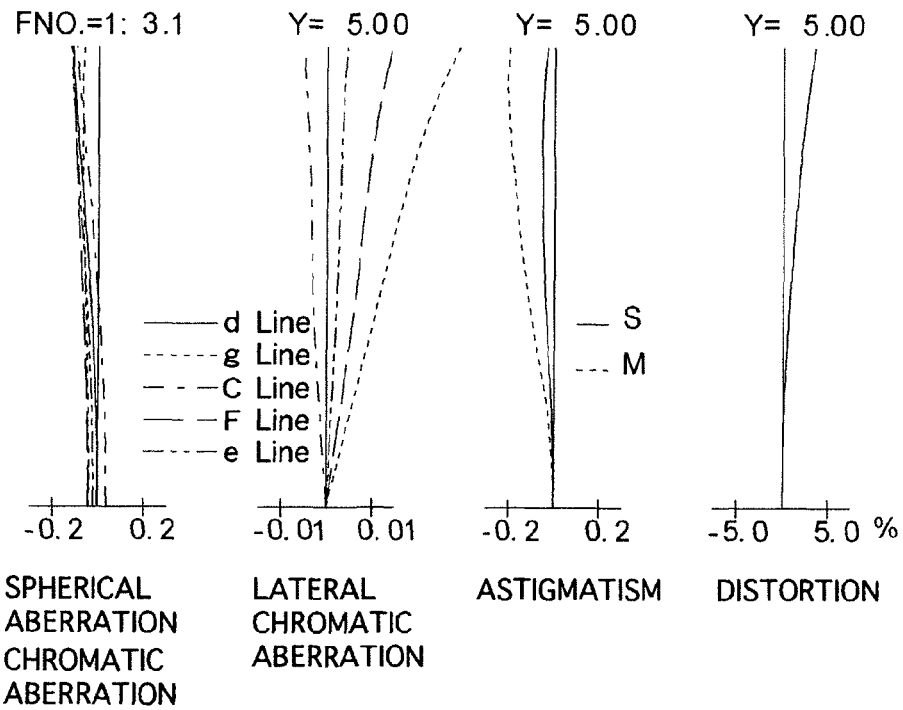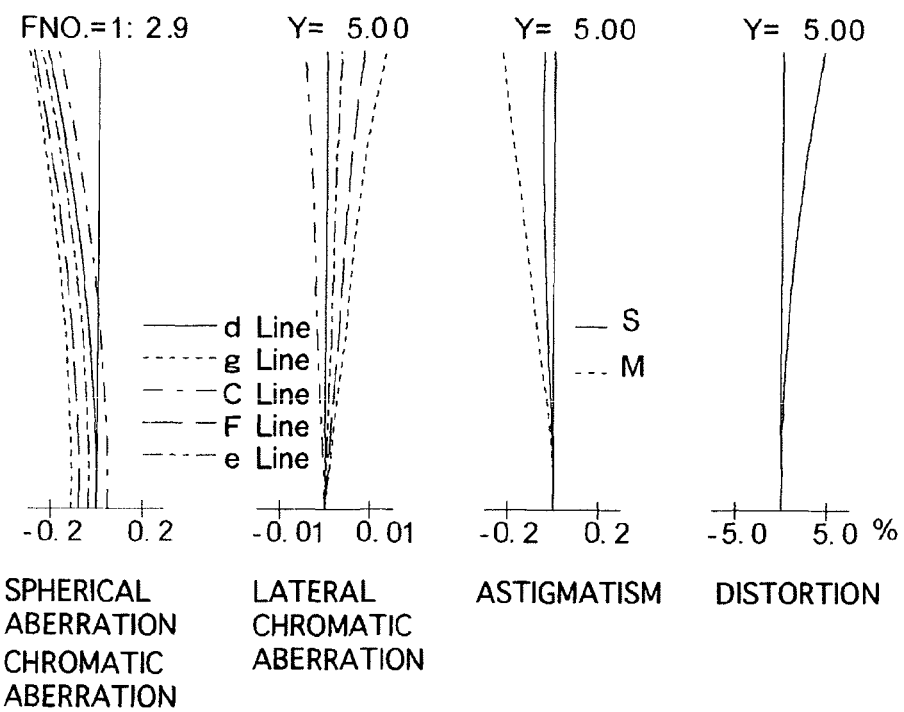

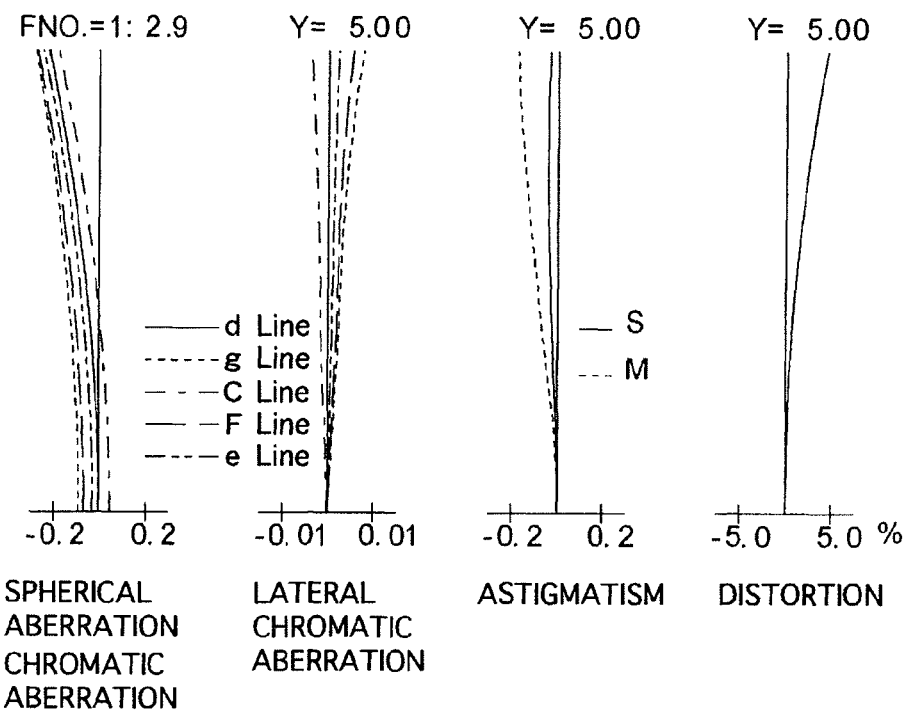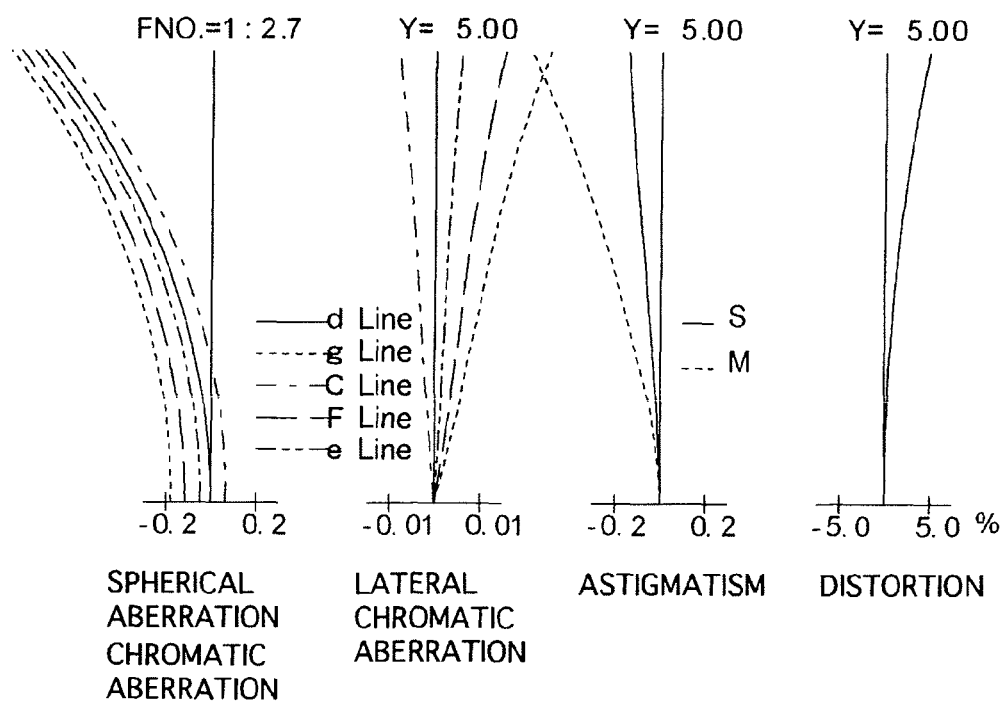

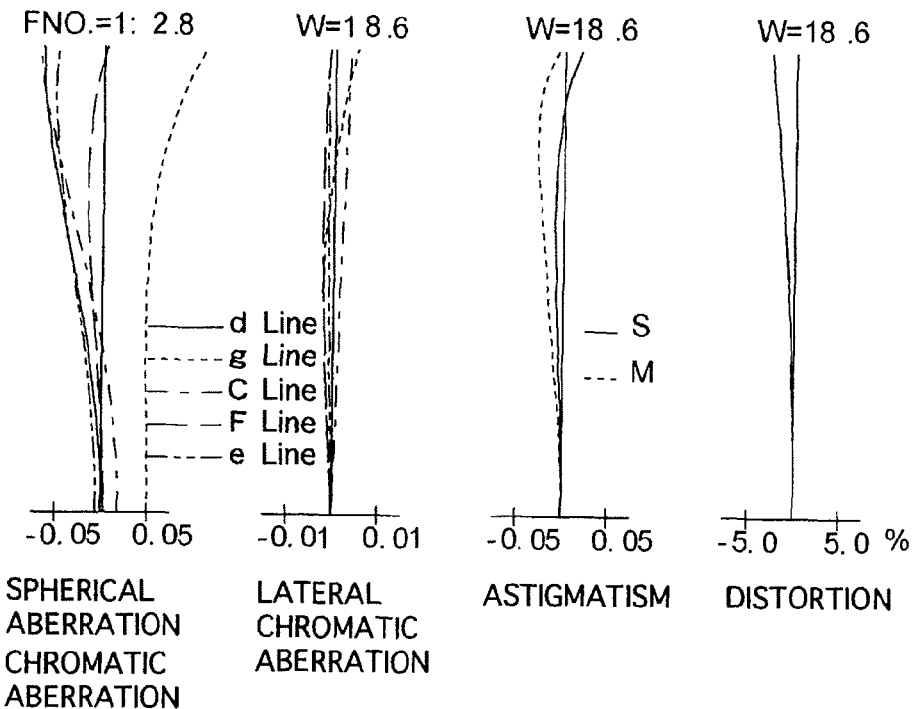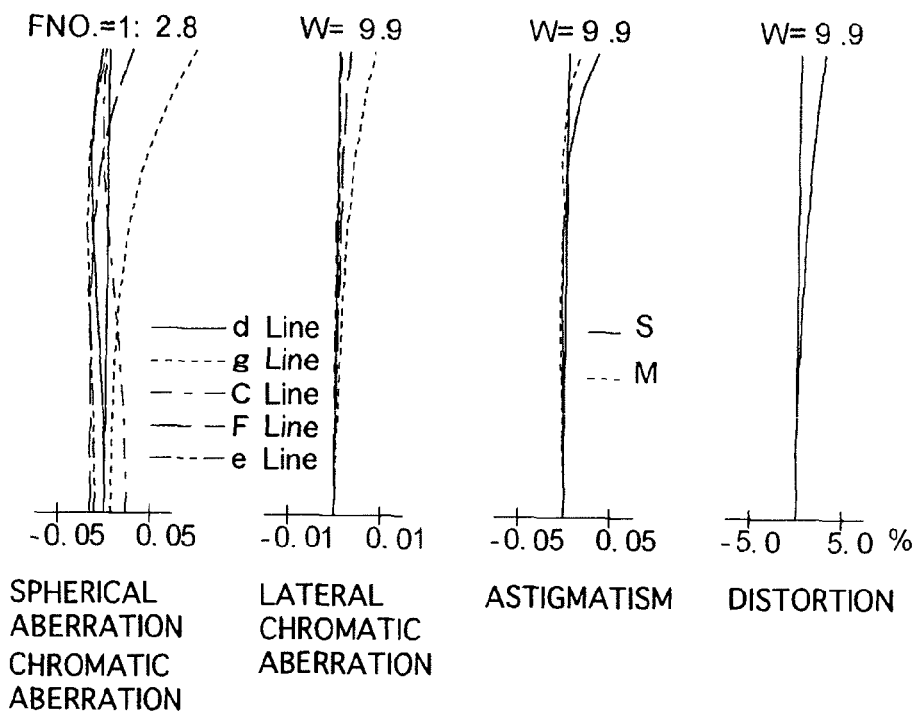

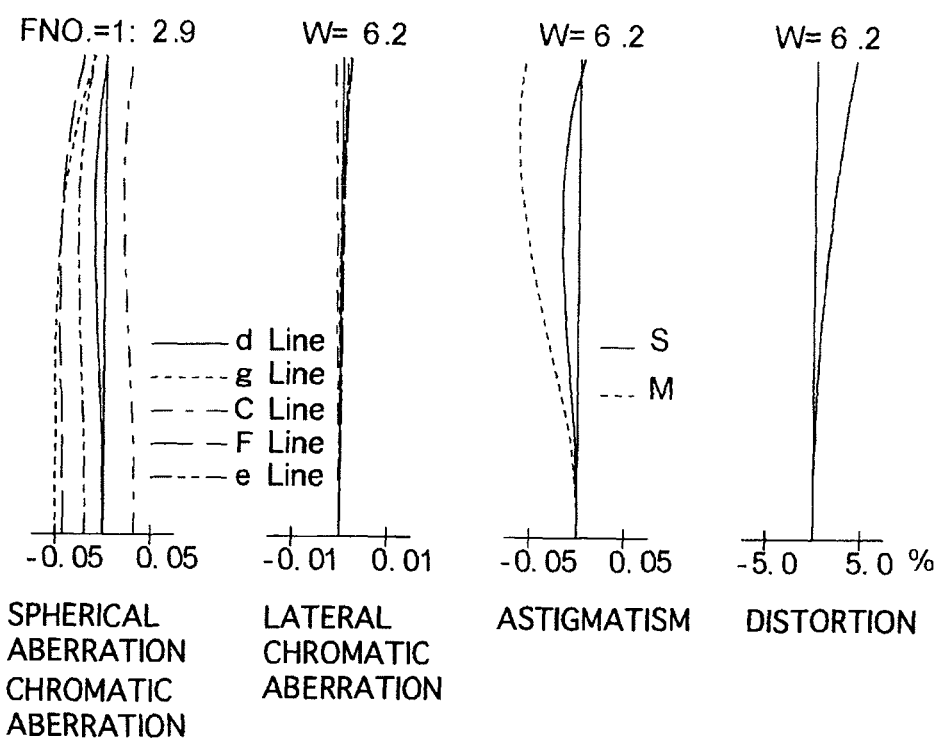

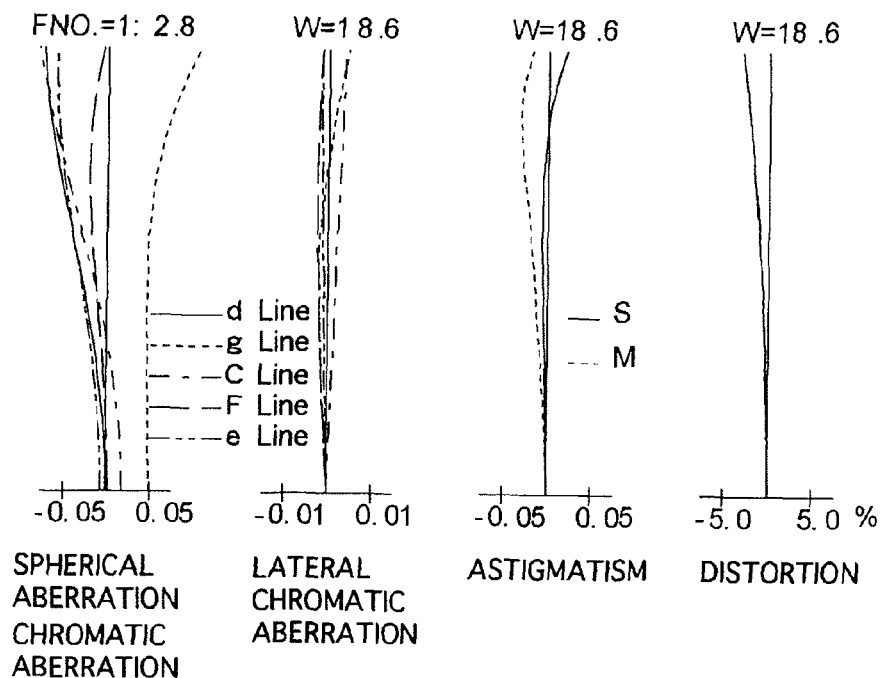
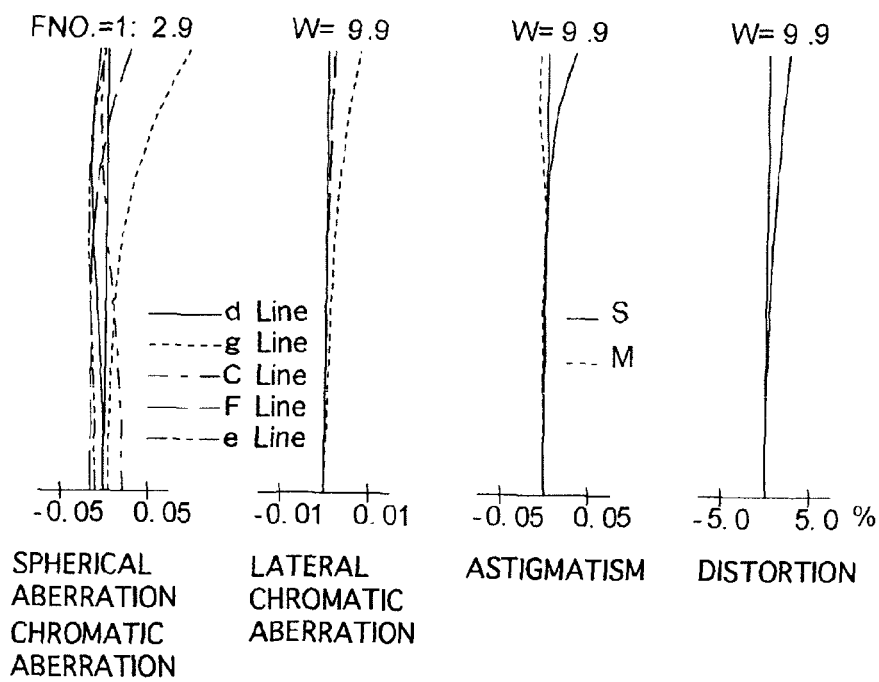

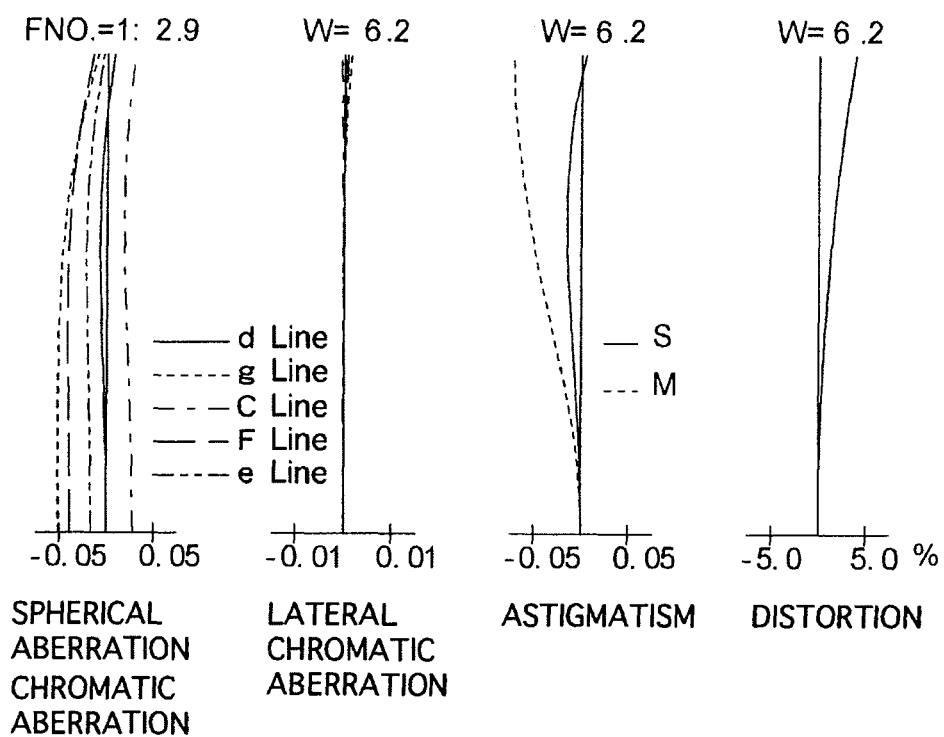

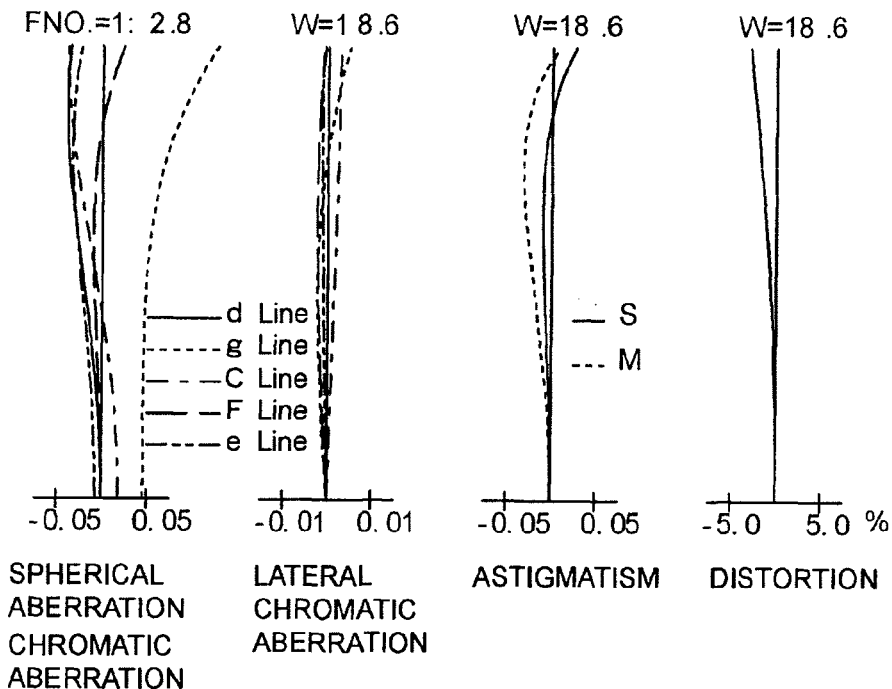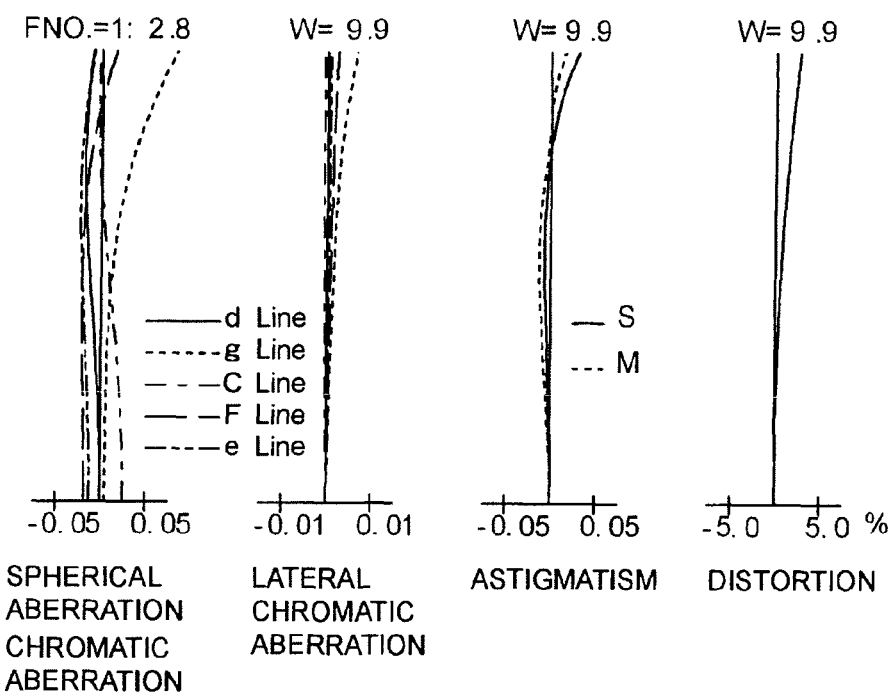

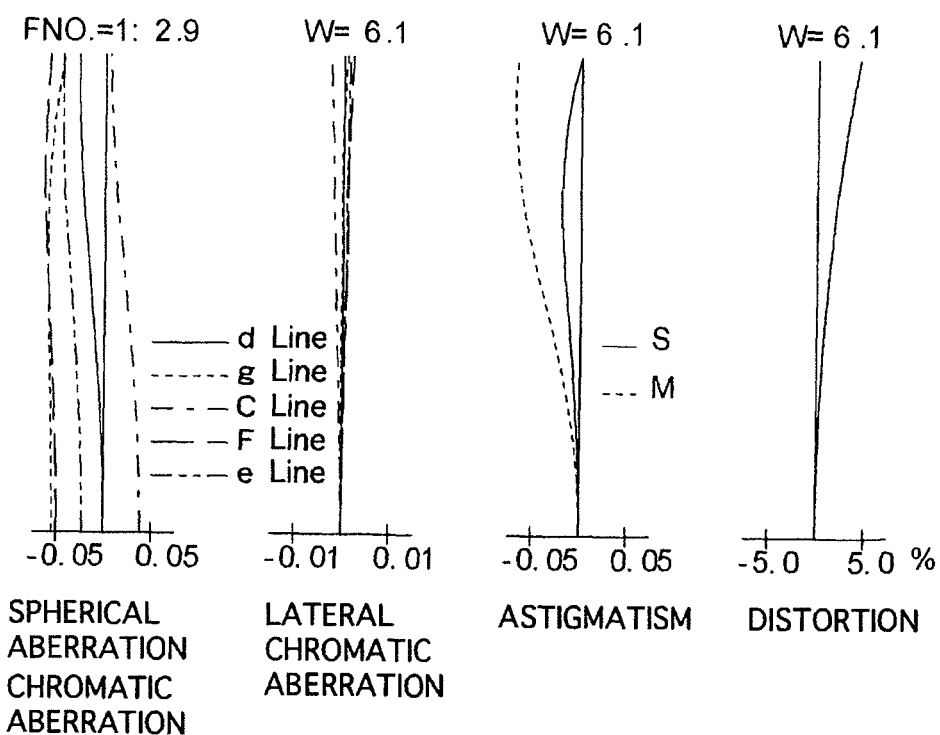

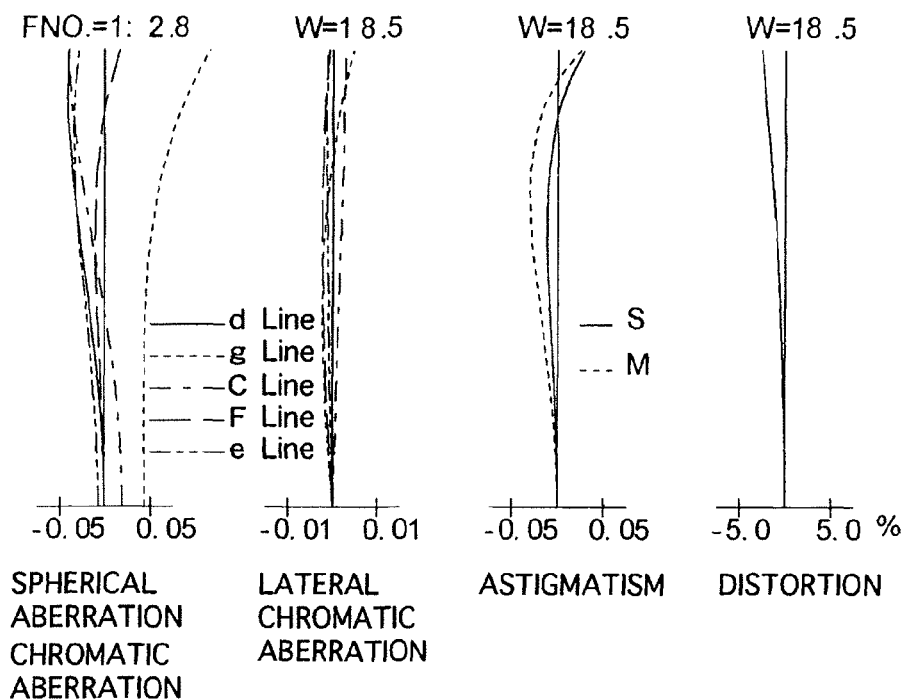
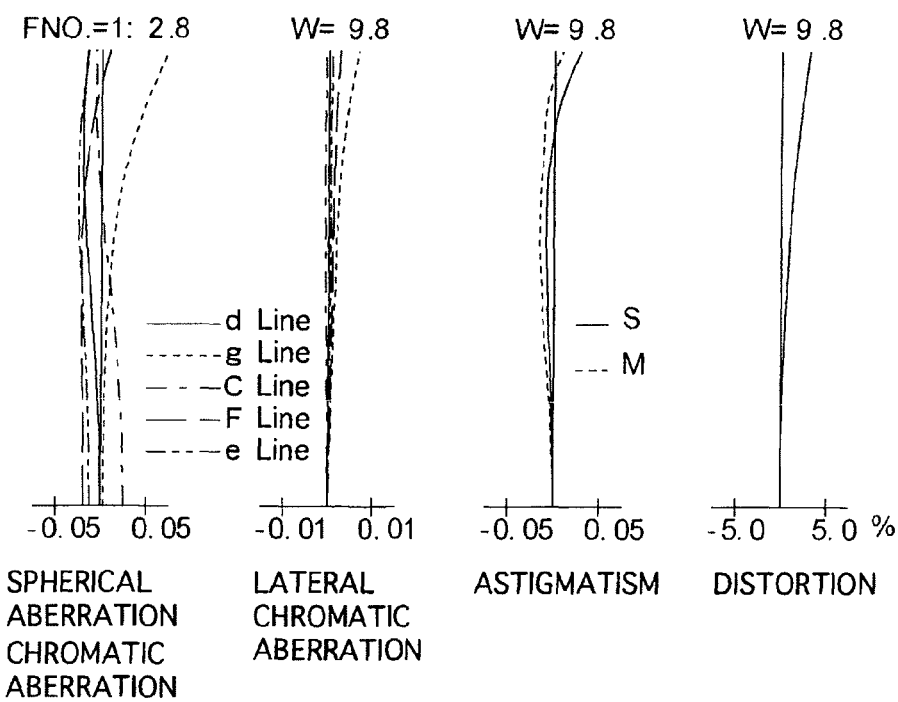

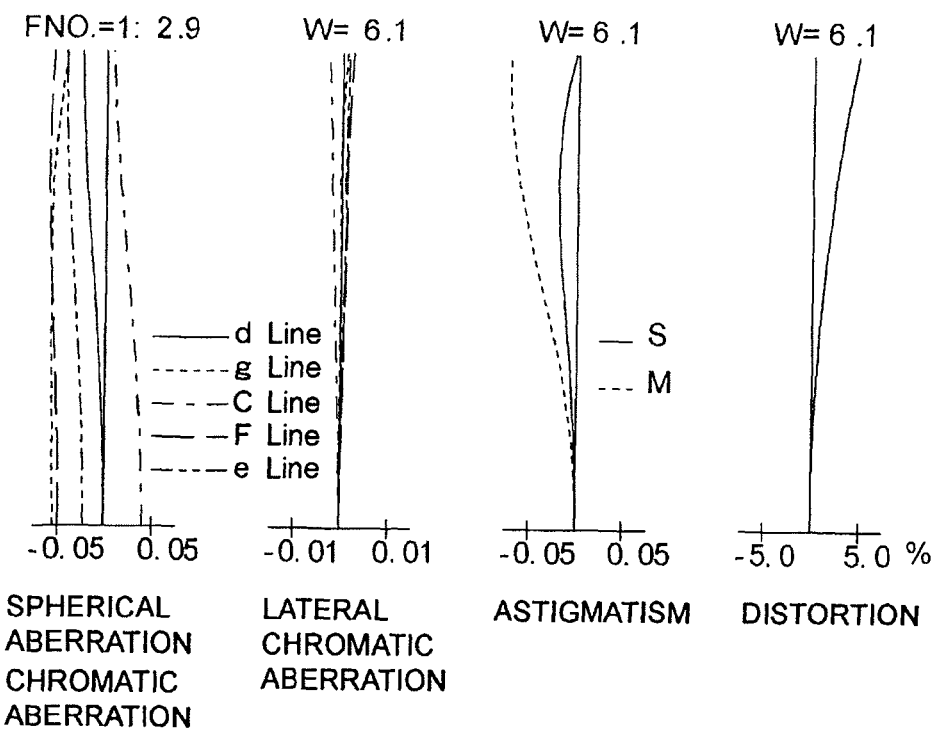

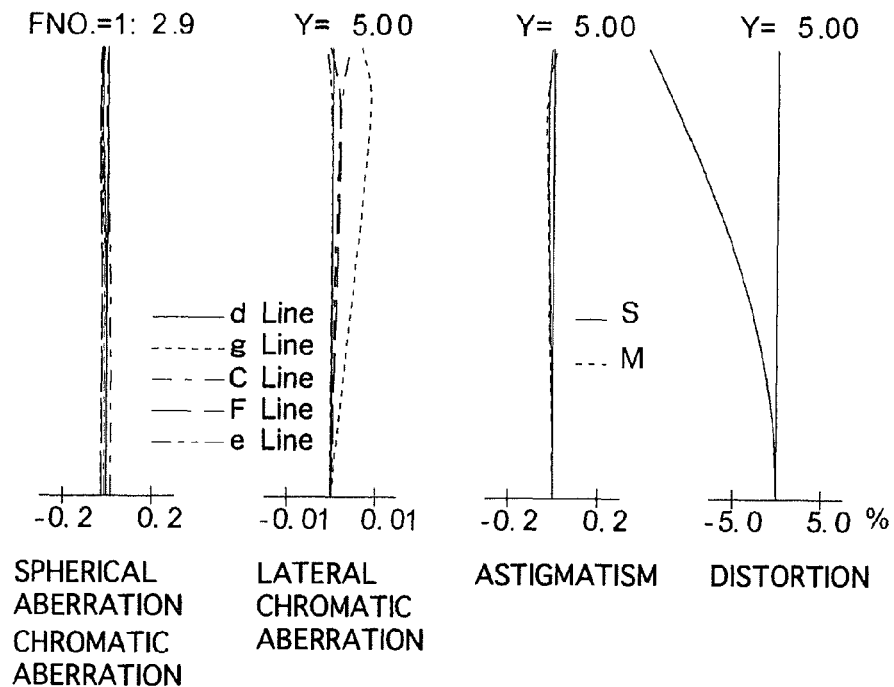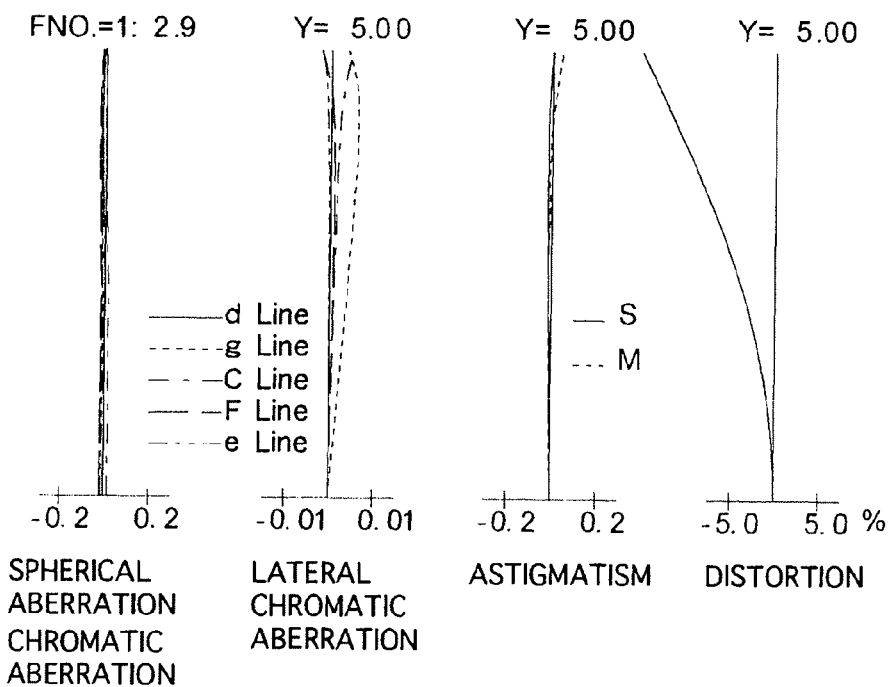

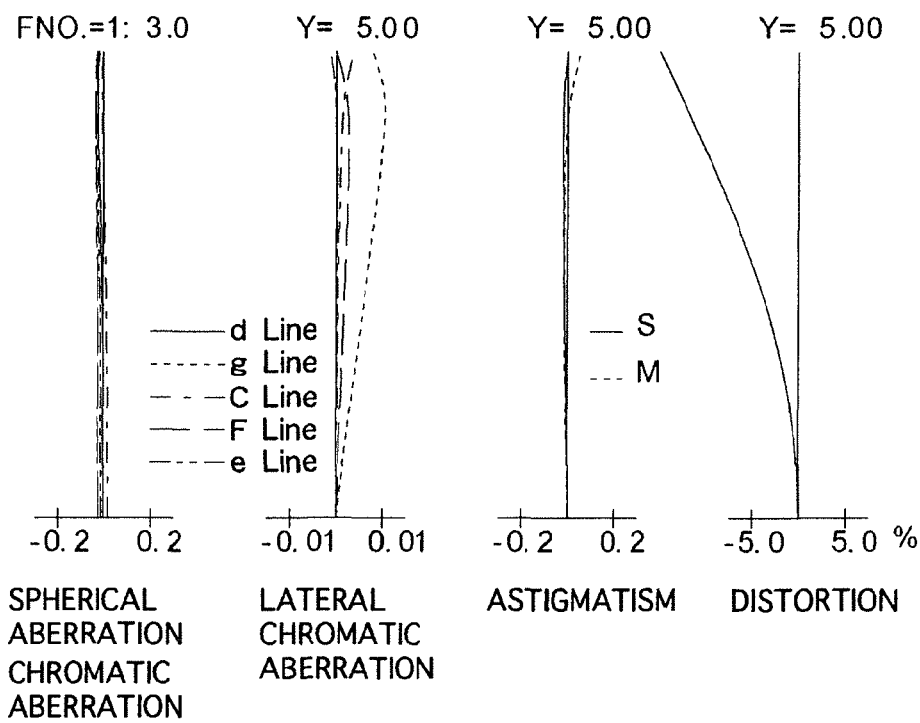
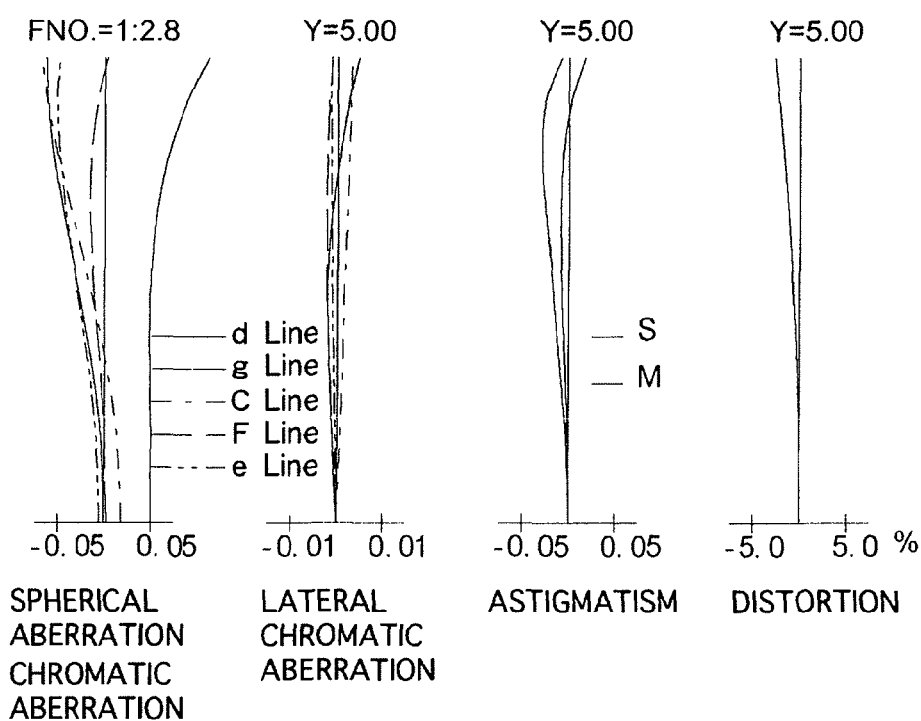

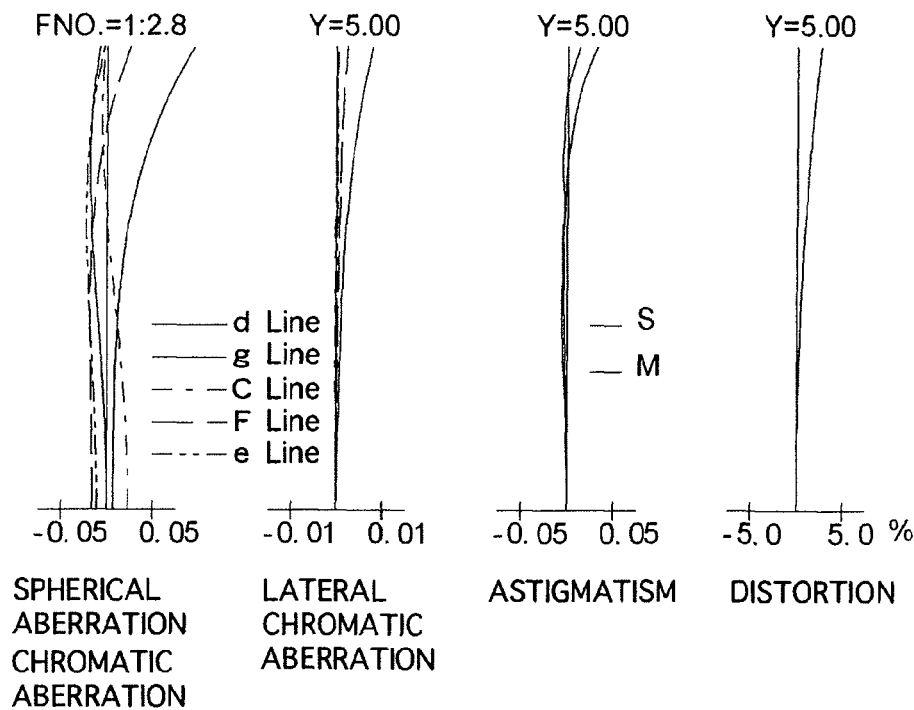
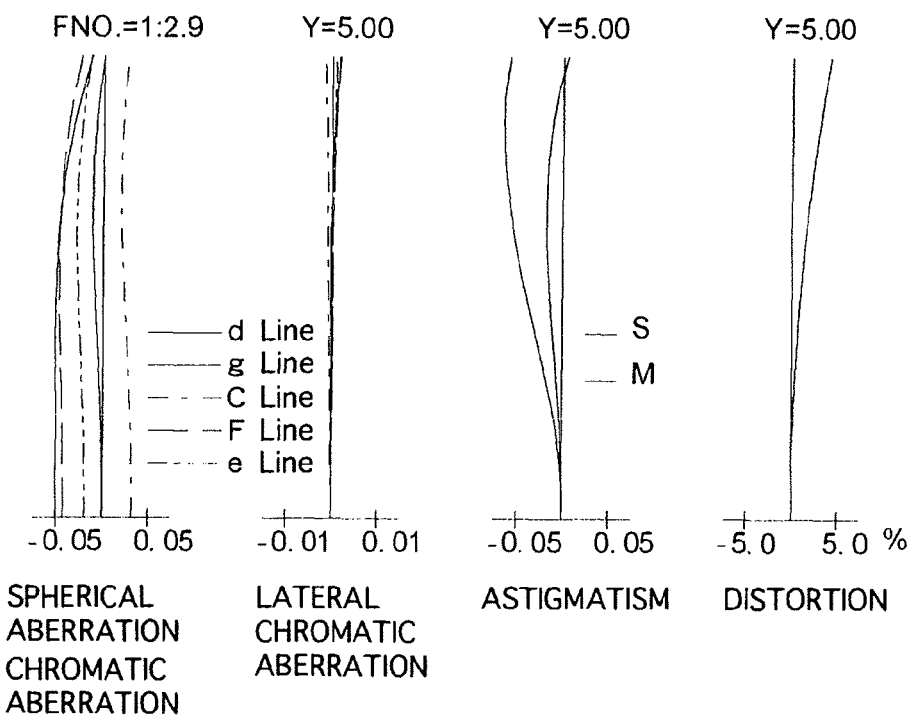

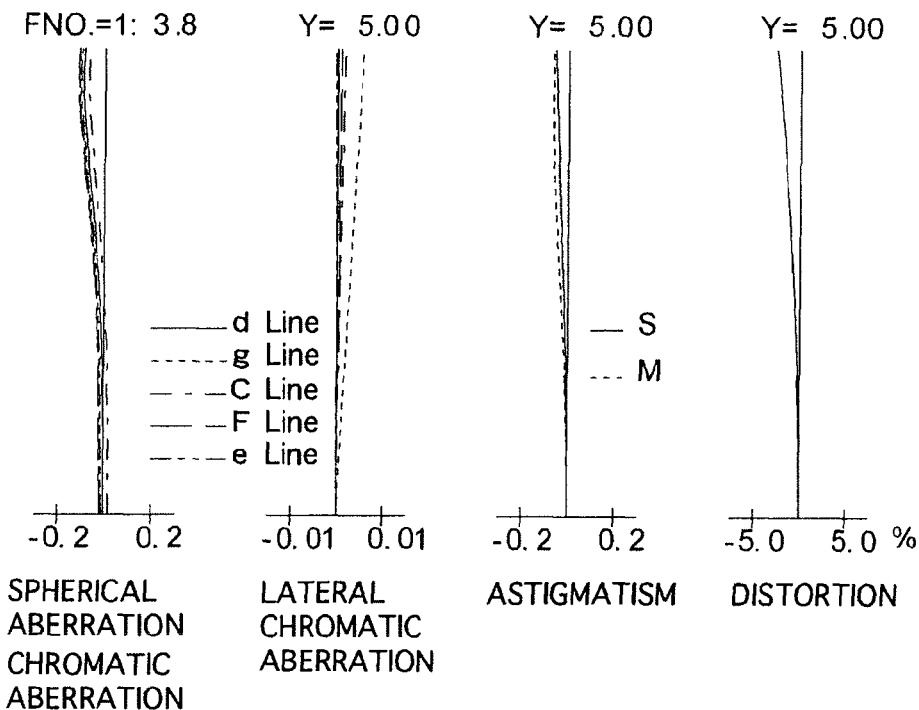
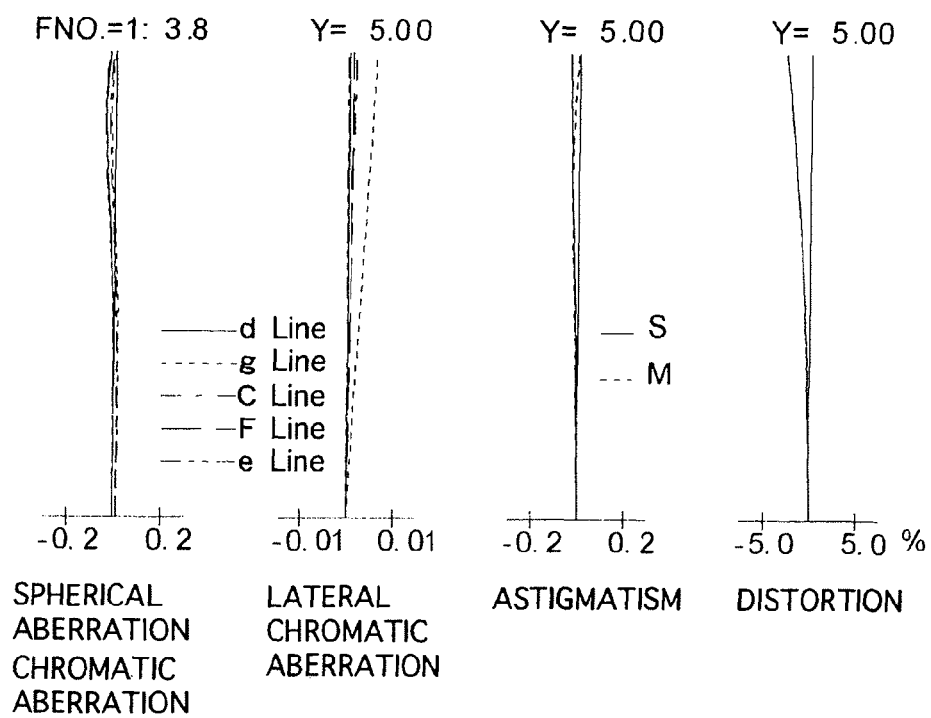

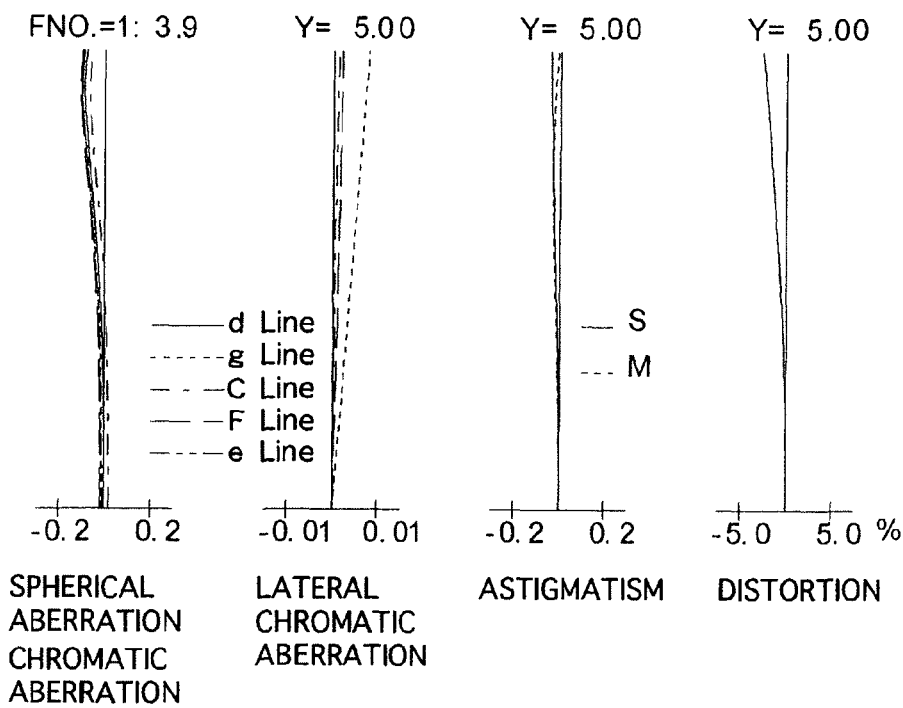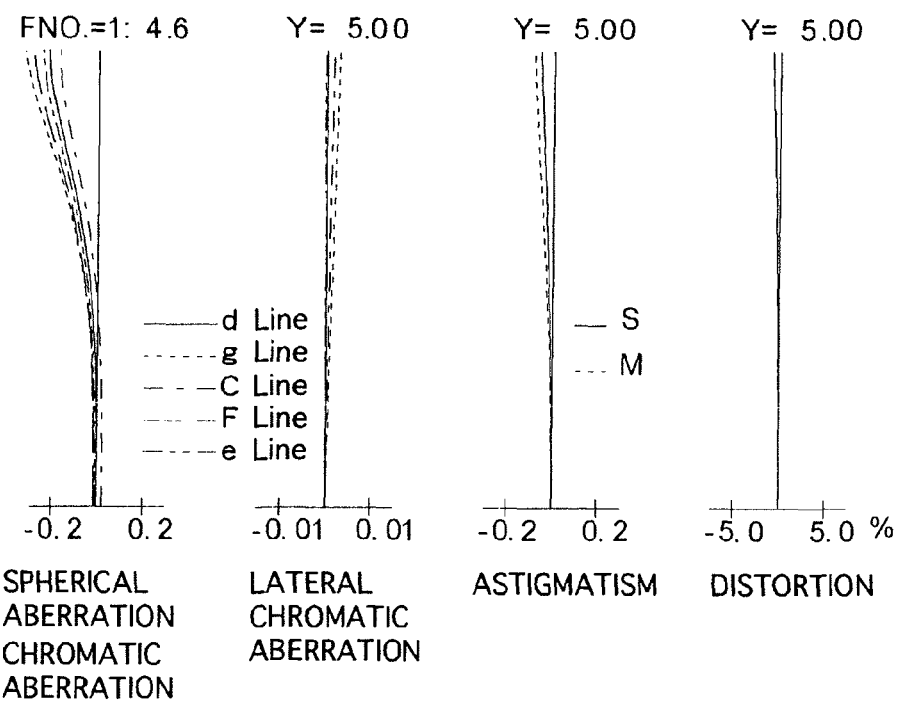

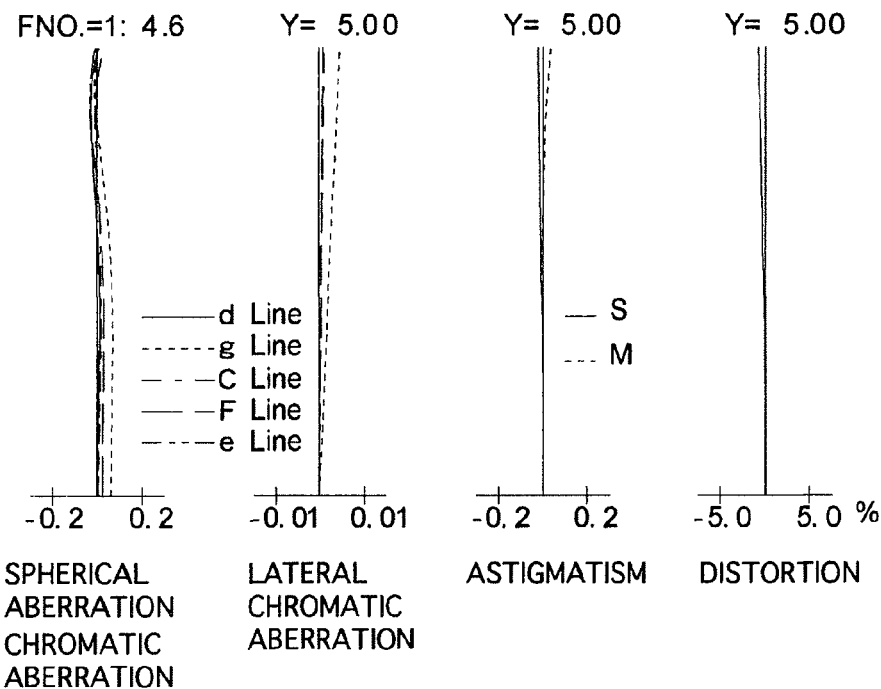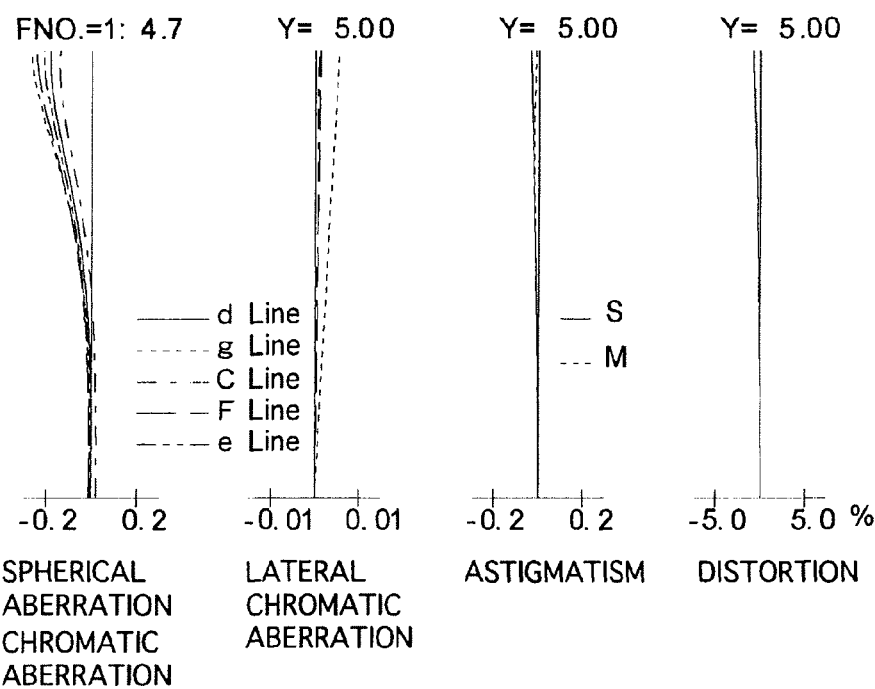

Focusing (Infinity→Predetermined Photographing Distance)

Normal Photography Mode → Macro Photography Mode

Focusing (Predetermined Photographing Distance → Minimum Photographing Distance)

ZOOM LENS SYSTEM

BACKGROUND OF THE INVENTION

1. Field of the Invention

The present invention relates to a zoom lens system provided with a macro photographic function by which an object at an infinity through to an object at a close distance can be photographed.

2. Description of Related Art

In recent years, zoom lens systems which are provided with a macro photographic function, by which an object at an object-distance range from infinity through to a close-distance can be photographed, have become known to be used in electronic imaging devices such as digital cameras, etc. Such a type of zoom lens system demands miniaturization and weight-reduction of the focusing lens group thereof, demands a rapid and silent focusing operation, and are required to achieve a short minimum photographing distance.

Japanese Patent No. 3,445,095, which discloses a zoom lens system having a positive first lens group, a negative second lens group, a negative third lens group and a positive fourth lens group, in that order from the object side (a total of four lens groups), teaches a focusing method (internal focusing method) in which the first lens group is divided into a front sub-lens group and a rear sub-lens group, and during a focusing operation on an object at infinity through to an object at a close distance, the front sub-lens group of the first lens group remains stationary while the rear sub-lens group of the first lens group moves toward the first sub-lens group (toward the object side).

Japanese Patent No. 3,710,277 which discloses a zoom lens system having a positive first lens group, a negative second lens group, a positive third lens group and a positive fourth lens group, in that order from the object side (a total of four lens groups), teaches a focusing method (floating focusing method) in which during a focusing operation on an object at infinity through to an object at a close distance, the first lens group and the fourth lens group remain stationary while the second lens group moves toward the image side and the third lens group moves toward the object side.

However, in the above-mentioned Japanese Patent No. 3,445,095, in order to shorten the minimum photographing distance, the number of lens elements and the weight of the first lens group needs to be increased for correcting various aberrations (spherical aberration, field curvature, and chromatic aberration) due to a change in the object distance, making it difficult to provide a rapid and silent focusing operation. Furthermore, in order to shorten the minimum photographing distance, a large advancing amount (toward the object side) of the rear sub-lens group within the first lens group must be secured, thereby increasing the size and weight of the first lens group, and in turn, the entire zoom lens system.

In the above-mentioned Japanese Patent No. 3,710,277, since the second lens group and the third lens group are concurrently moved in the optical axis direction during a focusing operation, it is difficult to provide a rapid and silent focusing operation. Furthermore, the entire zoom lens system including the focusing drive system undesirably increases in size and in weight.

SUMMARY OF THE INVENTION

The present invention has been devised in view of the above mentioned problems, and provides a zoom lens system which performs a rapid and silent focusing operation by miniaturizing and reducing the weight of the focusing lens group, and which has a short minimum photographing distance.

According to an aspect of the present invention, a zoom lens system is provided, including a plurality of lens groups, wherein at least one lens group of the plurality of lens groups is moved in a direction of the optical axis thereof to perform zooming, wherein a specified lens group of the plurality of lens groups includes a focusing lens group, which is moved in the optical axis direction in a focusing operation; a normal photography mode in which focusing is carried out from infinity to a predetermined photographing distance by continuously moving the focusing lens group of the specified lens group in an optical axis direction; and a shifting mode which shifts from the normal photography mode to a macro photography mode by moving at least one lens element of the specified lens group other than the focusing lens group when focusing on an object at a photographing distance that is shorter than the predetermined photographing distance of the normal photography mode. When the zoom lens system is in the macro photography mode, focusing is carried out from the predetermined photographing distance to a minimum photographing distance by continuously moving the focusing lens group of the specified lens group in an optical axis direction.

It is desirable for the specified lens group to include a positive first lens group which is provided closest to the object side out of the plurality of lens groups, and for the focusing lens group to be provided on the image side within the first lens group.

It is desirable for the specified lens group to include a negative first lens group which is provided closest to the object side out of the plurality of lens groups, and for the focusing lens group is provided on the image side within the first lens group.

During zooming from the short focal length extremity to the long focal length extremity, it is desirable for the first lens group to remain substantially stationary with respect to the image plane of the zoom lens system.

The expression "the first lens group is substantially stationary with respect to the image plane" refers to the first lens group not moving at all in the optical axis direction during zooming, and also refers to where even if the first lens group moves in the optical axis direction during zooming, the amount of movement of the focusing lens group is almost unchanged at each focal length.

In another embodiment, a zoom lens system is provided, including a positive first lens group, a negative second lens group, a positive third lens group, and a positive fourth lens group, in that order from the object side, wherein at least the second lens group and the third lens group move in an optical axis direction upon zooming from the short focal length extremity to the long focal length extremity, and wherein the first lens group includes a first sub-lens group and a second sub-lens group, in that order from the object side, the second sub-lens group constituting a focusing lens group which moves in the optical axis direction during a focusing operation; a normal photography mode in which focusing is carried out from infinity to a predetermined photographing distance by continuously moving the second sub-lens group in an optical axis direction while the first sub-lens group remains stationary; a shifting mode which shifts from the normal photography mode to a macro photography mode by moving both of the first sub-lens group and the second sub-lens group in the optical axis direction when focusing on an object at a photographing distance that is shorter than the predetermined photographing distance of the normal photography mode. When the zoom lens system is in the macro photography mode, focusing is carried out from the predetermined photographing distance to a minimum photographing distance by continuously moving the second sub-lens group in an optical axis direction while the first sub-lens group remains stationary.

It is desirable for the following condition (1) to be satisfied:

$$1.2 < f1b/f1G < 2.0 \tag{1},$$

wherein f1b designates the focal length of the second sub-lens group, and f1G designates the focal length of the first lens group.

In the normal photography mode, it is desirable for the second sub-lens group to be moved in the optical axis direction toward the first sub-lens group, which is stationary, when focusing is carried out from infinity to the predetermined photographing distance. In the shifting mode which shifts from the normal photography mode to a macro photography mode, it is desirable for the first sub-lens group and the second sub-lens group to mutually move away from each other in the optical axis direction. In the macro photography mode, it is desirable for the second sub-lens group to be moved in the optical axis direction toward the first sub-lens group, which is stationary, when focusing is carried out from the predetermined photographing distance to the minimum photographing distance.

It is desirable for the following condition (2) to be satisfied:

$$-4.0 < f3G/f2G < -2.0 \tag{2},$$

wherein f3G designates the focal length of the third lens group, and f2G designates the focal length of the second lens group.

In an embodiment, a zoom lens system is provided, including a negative first lens group, and a positive second lens group, in that order from the object side, wherein a distance between the first lens group and the second lens group decreases during zooming from the short focal length extremity to the long focal length extremity, and wherein the first lens group includes a first sub-lens group and a second sub-lens group, in that order from the object side, the second sub-lens group constituting a focusing lens group which moves in the optical axis direction during a focusing operation; a normal photography mode in which focusing is carried out from infinity to a predetermined photographing distance by continuously moving the second sub-lens group in an optical axis direction while the first sub-lens group remains stationary; a shifting mode which shifts from the normal photography mode to a macro photography mode by moving both of the first sub-lens group and the second sub-lens group in the optical axis direction when focusing on an object at a photographing distance that is shorter than the predetermined photographing distance of the normal photography mode. When the zoom lens system is in the macro photography mode, focusing is carried out from the predetermined photographing distance to a minimum photographing distance by continuously moving the second sub-lens group in an optical axis direction while the first sub-lens group remains stationary.

Upon zooming from the short focal length extremity to the long focal length extremity, it is desirable for the first lens group to first move toward the image side and thereafter move toward the object side, and for the second lens group to monotonically move toward the object side.

According to the present invention, a zoom lens system is achieved which performs a rapid and silent focusing operation by miniaturizing and reducing the weight of the focusing lens group, and which has a short minimum photographing distance.

The present disclosure relates to subject matter contained in Japanese Patent Application No. 2012-235240 (filed on Oct. 25, 2012) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the zoom lens system of FIG. 1 at the short focal length extremity when focused on an object at infinity;

FIGS. 3A, 3B, 3C and 3D show various aberrations that occurred in the lens arrangement shown in FIG. 1 at an intermediate focal length when focused on an object at infinity;

FIGS. 4A, 4B, 4C and 4D show various aberrations that occurred in the lens arrangement shown in FIG. 1 at the long focal length extremity when focused on an object at infinity;

FIGS. 5A, 5B, 5C and 5D show various aberrations that occurred in the zoom lens system of FIG. 1 at the short focal length extremity at a predetermined photographing distance (0.75 m) of a normal photography mode;

FIGS. 6A, 6B, 6C and 6D show various aberrations that occurred in the zoom lens system of FIG. 1 at the short focal length extremity at a predetermined photographing distance (0.75 m) of a macro photography mode;

FIGS. 7A, 7B, 7C and 7D show various aberrations that occurred in the zoom lens system of FIG. 1 at the short focal length extremity at a minimum photographing distance (0.35 m) of a macro photography mode;

FIGS. 10A, 10B, 10C and 10D show various aberrations that occurred in the zoom lens system of FIG. 1 at an intermediate focal length at a minimum photographing distance (0.35 m) of a macro photography mode;

FIGS. 11A, 11B, 11C and 11D show various aberrations that occurred in the zoom lens system of FIG. 1 at the long focal length extremity at a predetermined photographing distance (0.75 m) of a normal photography mode;

FIGS. 12A, 12B, 12C and 12D show various aberrations that occurred in the zoom lens system of FIG. 1 at the long focal length extremity at a predetermined photographing distance (0.75 m) of a macro photography mode;

FIGS. 13A, 13B, 13C and 13D show various aberrations that occurred in the zoom lens system of FIG. 1 at the long focal length extremity at a minimum photographing distance (0.35 m) of a macro photography mode;

FIGS. 15A, 15B, 15C and 15D show various aberrations that occurred in the zoom lens system of FIG. 14 at the short focal length extremity when focused on an object at infinity;

FIGS. 16A, 16B, 16C and 16D show various aberrations that occurred in the lens arrangement shown in FIG. 14 at an intermediate focal length when focused on an object at infinity;

FIGS. 17A, 17B, 17C and 17D show various aberrations that occurred in the lens arrangement shown in FIG. 14 at the long focal length extremity when focused on an object at infinity;

FIGS. 19A, 19B, 19C and 19D show various aberrations that occurred in the zoom lens system of FIG. 18 at the short focal length extremity when focused on an object at infinity;

FIGS. 20A, 20B, 20C and 20D show various aberrations that occurred in the lens arrangement shown in FIG. 18 at an intermediate focal length when focused on an object at infinity;

FIGS. 21A, 21B, 21C and 21D show various aberrations that occurred in the lens arrangement shown in FIG. 18 at the long focal length extremity when focused on an object at infinity;

FIGS. 23A, 23B, 23C and 23D show various aberrations that occurred in the zoom lens system of FIG. 22 at the short focal length extremity when focused on an object at infinity;

FIGS. 24A, 24B, 24C and 24D show various aberrations that occurred in the lens arrangement shown in FIG. 22 at an intermediate focal length when focused on an object at infinity;

FIGS. 25A, 25B, 25C and 25D show various aberrations that occurred in the lens arrangement shown in FIG. 22 at the long focal length extremity when focused on an object at infinity;

FIGS. 27A, 27B, 27C and 27D show various aberrations that occurred in the zoom lens system of FIG. 26 at the short focal length extremity when focused on an object at infinity;

FIGS. 28A, 28B, 28C and 28D show various aberrations that occurred in the lens arrangement shown in FIG. 26 at an intermediate focal length when focused on an object at infinity;

FIGS. 29A, 29B, 29C and 29D show various aberrations that occurred in the lens arrangement shown in FIG. 26 at the long focal length extremity when focused on an object at infinity;

FIGS. 31A, 31B, 31C and 31D show various aberrations that occurred in the zoom lens system of FIG. 30 at the short focal length extremity when focused on an object at infinity;

FIGS. 32A, 32B, 32C and 32D show various aberrations that occurred in the lens arrangement shown in FIG. 30 at an intermediate focal length when focused on an object at infinity;

FIGS. 33A, 33B, 33C and 33D show various aberrations that occurred in the lens arrangement shown in FIG. 30 at the long focal length extremity when focused on an object at infinity;

FIGS. 34A, 34B, 34C and 34D show various aberrations that occurred in the zoom lens system of FIG. 30 at the short focal length extremity at a predetermined photographing distance (0.75 m) of a normal photography mode;

FIGS. 35A, 35B, 35C and 35D show various aberrations that occurred in the zoom lens system of FIG. 30 at the short focal length extremity at a predetermined photographing distance (0.75 m) of a macro photography mode;

FIGS. 36A, 36B, 36C and 36D show various aberrations that occurred in the zoom lens system of FIG. 30 at the short focal length extremity at a minimum photographing distance (0.35 m) of a macro photography mode;

FIGS. 37A, 37B, 37C and 37D show various aberrations that occurred in the zoom lens system of FIG. 30 at an intermediate focal length at a predetermined photographing distance (0.75 m) of a normal photography mode;

FIGS. 38A, 38B, 38C and 38D show various aberrations that occurred in the zoom lens system of FIG. 30 at an intermediate focal length at a predetermined photographing distance (0.75 m) of a macro photography mode;

FIGS. 39A, 39B, 39C and 39D show various aberrations that occurred in the zoom lens system of FIG. 30 at an intermediate focal length at a minimum photographing distance (0.35 m) of a macro photography mode;

FIGS. 40A, 40B, 40C and 40D show various aberrations that occurred in the zoom lens system of FIG. 30 at the long focal length extremity at a predetermined photographing distance (0.75 m) of a normal photography mode;

FIGS. 41A, 41B, 41C and 41D show various aberrations that occurred in the zoom lens system of FIG. 30 at the long focal length extremity at a predetermined photographing distance (0.75 m) of a macro photography mode;

FIGS. 42A, 42B, 42C and 42D show various aberrations that occurred in the zoom lens system of FIG. 30 at the long focal length extremity at a minimum photographing distance (0.35 m) of a macro photography mode;

DESCRIPTION OF THE EMBODIMENTS

The zoom lens system according to the present invention will be herein described via a "first embodiment" constituting first through fifth numerical embodiments and a "second" embodiment constituting a sixth numerical embodiment; the fundamental lens configuration and operations (zooming and focusing operations) differ between the first and second embodiments.

First Embodiment

Figure 43:
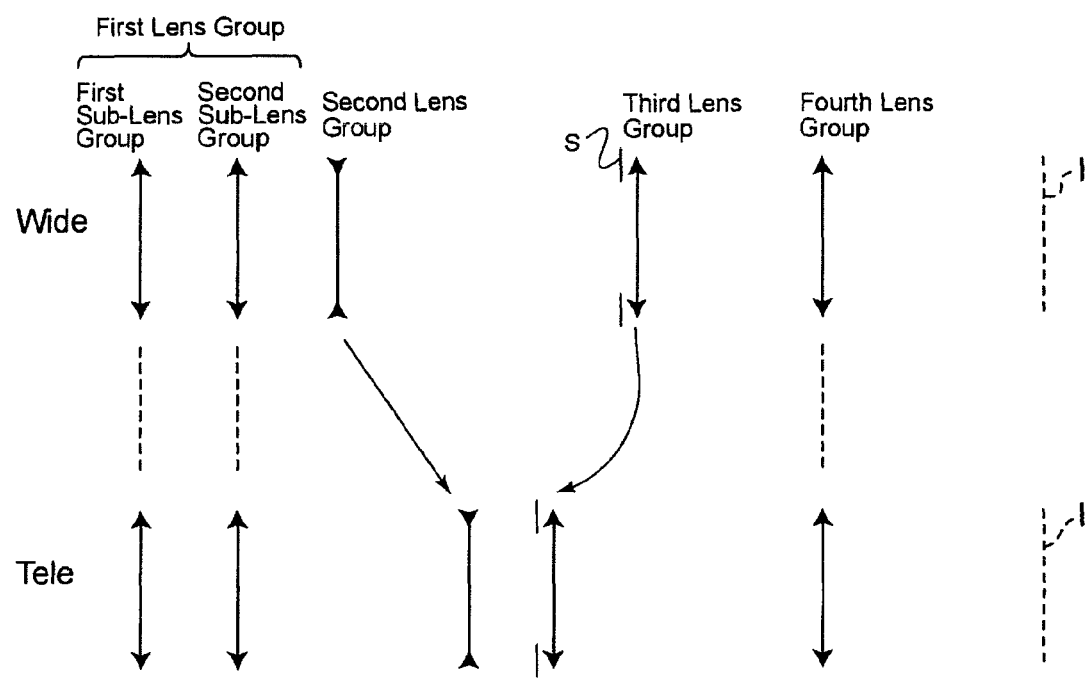
FIG. 43 shows a zoom path of the zoom lens system according to the first embodiment.

As shown in the zoom path of FIG. 43, the zoom lens system of the first embodiment is configured of a positive first lens group (specified lens group) G1, a negative second lens group G2, a positive third lens group G3, and a positive fourth lens group G4, in that order from the object side. The first lens group G1 is configured of a positive first sub-lens group G1a and a positive second sub-lens group (focusing lens group) G1b, in that order from the object side. A diaphragm S which is provided between the second lens group G2 and the third lens group G3 moves integrally with the third lens group G3 in the optical axis direction. "I" designates the image plane.

In the zoom lens system of the first embodiment, upon zooming from the short focal length extremity (Wide) to the long focal length extremity (Tele), the distance between the first lens group G1 and the second lens group G2 increases, the distance between the second lens group G2 and the third lens group G3 decreases, and the distance between the third lens group G3 and the fourth lens group G4 increases. Upon zooming from the short focal length extremity to the long focal length extremity, the distance between the first sub-lens group G1a and the second sub-lens group G1b does not change.

More specifically, upon zooming from the short focal length extremity to the long focal length extremity, the first lens group G1 (the first sub-lens group G1a and the second sub-lens group G1b) and the fourth lens group G4 remain substantially stationary (do not move in the optical axis direction) with respect to the image plane I.

The expression "the first lens group is substantially stationary with respect to the image plane I" refers to the first lens group G1 not moving at all in the optical axis direction during zooming, and also refers to the case where even if the first lens group moves by a slight amount in the optical axis direction during zooming, the amount of movement of the focusing lens group (second sub-lens group G1b) is almost unchanged throughout the zooming (focal length) range.

Upon zooming from the short focal length extremity to the long focal length extremity, the second lens group G2 moves monotonically toward the image side.

Upon zooming from the short focal length extremity to the long focal length extremity, the third lens group G3 either moves monotonically toward the object side, or first moves toward the image side past the position thereof at the short focal length extremity and thereafter moves toward the object side (thereby resulting in the third lens group G3 being moved toward the object side as a whole).

As shown in the lens arrangements in FIGS. 1, 14, 18, 22 and 26, the first sub-lens group G1a is configured of a cemented lens having a negative lens element 11 and a positive lens element 12; and a positive lens element 13, in that order from the object side. The second sub-lens group G1b is configured of a positive single lens element 14. The second lens group G2 is configured of a negative lens element 21, a cemented lens provided with a negative lens element 22 and a positive lens element 23; and a negative lens element 24, in that order from the object side. The third lens group G3 is configured of a cemented lens provided with a positive lens element 31 and a negative lens element 32, in that order from the object side. The fourth lens group is configured of a positive lens element 41, a cemented lens provided with a positive lens element 42 and a negative lens element 43; a positive lens element 44, and a negative lens element 45, in that order from the object side.

In the first embodiment of the zoom lens system, the positive single lens element 14 of the second sub-lens group G1b, which is part of the first lens group G1, constitutes a focusing lens group which is moved along the optical axis direction during a focusing operation. According to this configuration, it is possible to achieve a focusing lens group which is miniaturized and reduced in weight, such that a rapid and quiet focusing operation can be performed; and hence, such a focusing lens group can meet the demands for miniaturization and reduction in weight in, e.g., a mirrorless camera, in which an optical finder split mirror is omitted.

In regard to focusing on an object at infinity to an object at a finite distance, the first embodiment of the zoom lens system includes the following distinctive focusing modes: a "normal photography mode", a "shifting mode", and a "macro photography mode". The zoom lens system of the first embodiment can stay in the "macro photography mode" at any focal length, regardless of the focal length to which the zoom lens system has been zoomed. Furthermore, since the positional relationship of the second sub-lens group G1b with respect to the first sub-lens group G1a is constant (unchanging) when focused at a predetermined distance, regardless of a change in focal length due to zooming, even if zooming was carried out after focusing on a given object, the focusing state remains, in effect, unchanged.

Figure 44A:
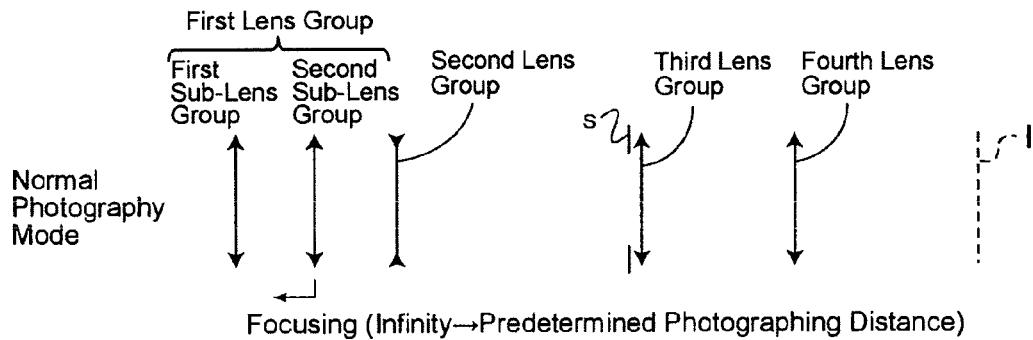
FIG. 44A shows a normal photography mode of the zoom lens system, according to the first embodiment of the present invention, at the short focal length extremity.

As shown in FIG. 44A, in the normal photography mode, with the first sub-lens group G1a remaining stationary (fixed) during an infinite through to a predetermined photographing distance (0.75 m), focusing is carried out by continuously moving the second sub-lens group G1b toward the stationary first sub-lens group G1a (toward the object side).

Figure 44B:
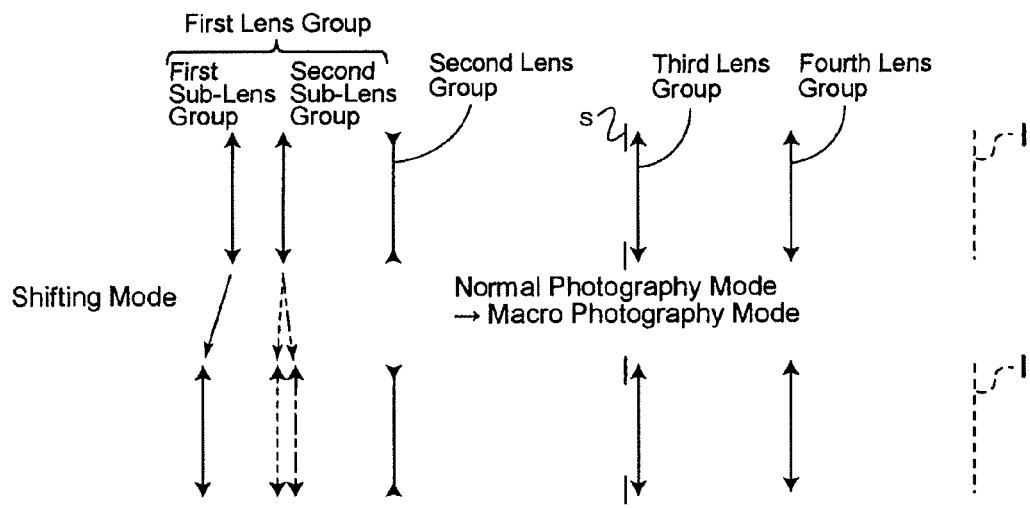
FIG. 44B shows a shifting mode of the first embodiment of the zoom lens system at the short focal length extremity.

As shown in FIG. 44B, in order to focus on an object located at a distance that is shorter than the predetermined photographing distance (0.75 m) in the normal photography mode, the focusing mode can be shifted from the normal photography mode to the macro photography mode by moving the first sub-lens group G1a toward the object side. During this mode-shifting operation, as shown by the broken line in FIG. 44B, the second sub-lens group G1b can be moved toward the object side together with the first sub-lens group G1a while increasing the distance between the first sub-lens group G1a and the second sub-lens group G1b which are at the predetermined photographing distance (0.75), or the second sub-lens group G1b can be moved toward the image side, as shown by the single-dot chain line to increase the distance between the first sub-lens group G1a and the second sub-lens group G1b while moving the first sub-lens group G1a toward the object side. Furthermore, as shown in the lens data of each numerical embodiment, if the distance between the first sub-lens group G1a and the second sub-lens group G1b is increased while appropriately controlling the position of the second sub-lens group G1b in accordance with the movement of the first sub-lens group G1a, it is possible to shift from the normal photography mode to the macro photography mode while remaining at the focused state on an object at a predetermined photographing distance (0.75 m).

Figure 44C:
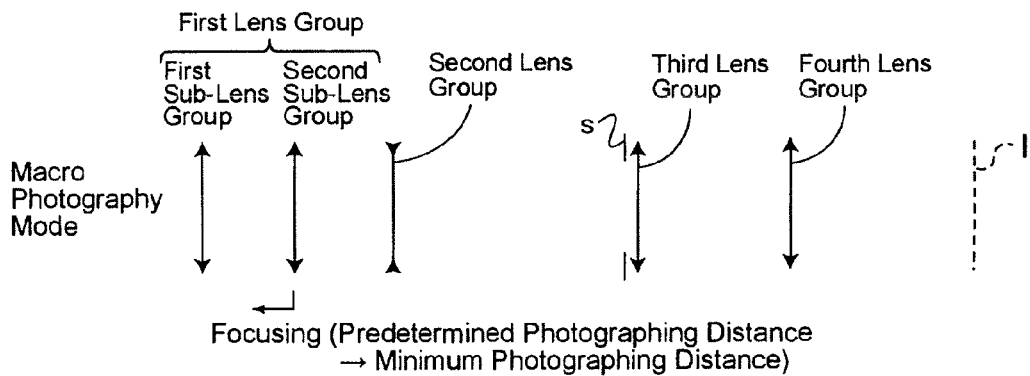
FIG. 44C shows a macro photography mode of the first embodiment of the zoom lens system at the short focal length extremity.

As shown in FIG. 44C, in the macro photography mode, with the first sub-lens group G1a remaining stationary, the second sub-lens group G1b is continuously moved toward the stationary first sub-lens group G1a using the space between the first sub-lens group G1a and the second sub-lens group G1b, the distance therebetween which was increased in the shifting mode, from the predetermined photographing distance (0.75 m) to the minimum photographing distance (0.35 m), and furthermore, focusing is carried out up to a close distance.

Condition (1) specifies the ratio of the focal length of the second sub-lens group G1b to the focal length of the first lens group G1. By satisfying condition (1), the minimum photographing distance can be shortened, the amount of movement of the focusing lens group (second sub-lens group G1b) can be reduced so that the first lens group G1, and in turn the entire zoom lens system, can be miniaturized, and furthermore, the manufacturing thereof can be facilitated due to a reduction in decentration.

If the upper limit of condition (1) is exceeded, the optical power of the second sub-lens group G1b becomes too weak, so that due to an increase in the amount of movement of the focusing lens group (second sub-lens group G1b), the first lens group G1, and in turn the entire zoom lens system, is enlarged (the overall length of the zoom lens system is increased). Nevertheless, if attempts are made to reduce the amount of movement of the focusing lens group, the minimum photographing distance cannot be shortened.

If the lower limit of condition (1) is exceeded, the optical power of the second sub-lens group G1b becomes too strong, decentration increases, and the manufacture thereof becomes difficult.

Condition (2) specifies the ratio of the focal length of the third lens group G3 to the focal length of the second lens group G2. By satisfying condition (2), upon zooming from the short focal length extremity to the long focal length extremity, fluctuations in aberrations such as coma and field curvature that occur during zooming from the short focal length extremity to the long focal length extremity (also in the case where the first lens group G1 is stationary with respect to the image plane) can be suppressed.

If the upper limit of condition (2) is exceeded, the positive optical power of the third lens group G3 becomes too strong compared to the negative optical power of the second lens group G2, so that fluctuations in coma increase during zooming from the short focal length extremity to the long focal length extremity.

If the lower limit of condition (2) is exceeded, the negative optical power of the second lens group G2 becomes too strong compared to the positive optical power of the third lens group G3, and it becomes difficult to suppress field curvature fluctuations during zooming from the short focal length extremity to the long focal length extremity.

Second Embodiment

Figure 45:
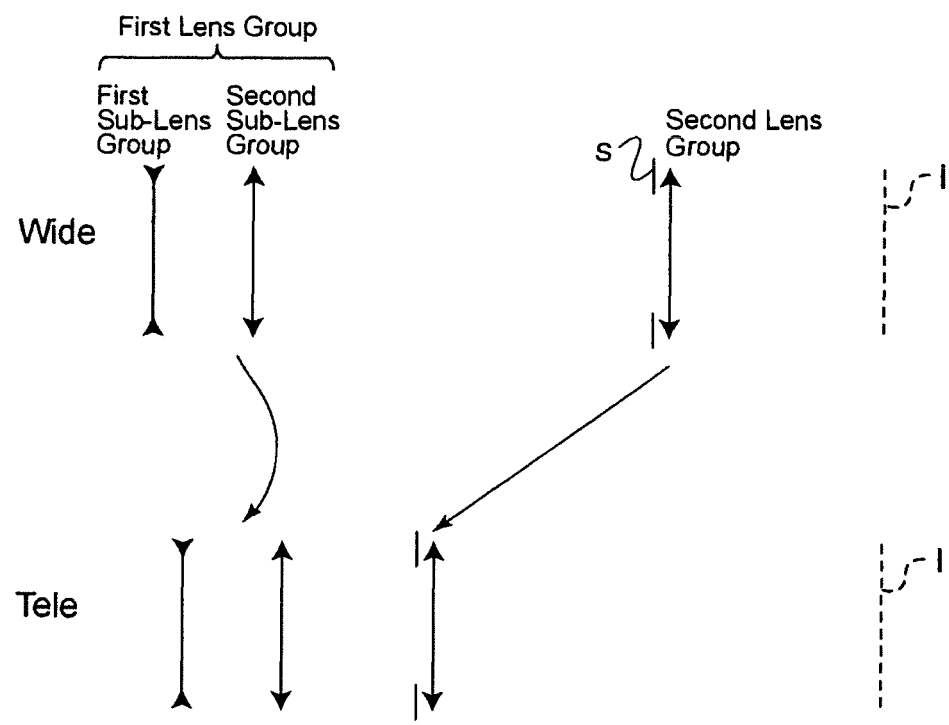
FIG. 45 shows a zoom path of the zoom lens system according to the second embodiment.

As shown in the zoom path of FIG. 45, the zoom lens system of the second embodiment is configured of a negative first lens group (specified lens group) G1' and a positive second lens group G2', in that order from the object side. The first lens group G1' is configured of a negative first sub-lens group G1a' and a positive second sub-lens group (focusing lens group) G1b' in that order from the object side. A diaphragm S which is provided between the first lens group G1' and the second lens group G2' moves integrally with the second lens group G2 in the optical axis direction. "I" designates the image plane.

The zoom lens system of the second embodiment, upon zooming from the short focal length extremity (Wide) to the long focal length extremity (Tele), the distance between the first lens group G1' and the second lens group G2' decreases. Upon zooming from the short focal length extremity to the long focal length extremity, the distance between the first sub-lens group G1a' and the second sub-lens group G1b' remains unchanged.

More specifically, upon zooming from the short focal length extremity to the long focal length extremity, the first lens group G1' (the first sub-lens group G1a' and the second sub-lens group G1b') first moves toward the image side and thereafter moves toward the object side. There is almost no change in the movement amount of the focusing lens group (second sub-lens group G1b') at each focal length.

Upon zooming from the short focal length extremity to the long focal length extremity, the second lens group G2' moves monotonically toward the object side.

Figure 30:
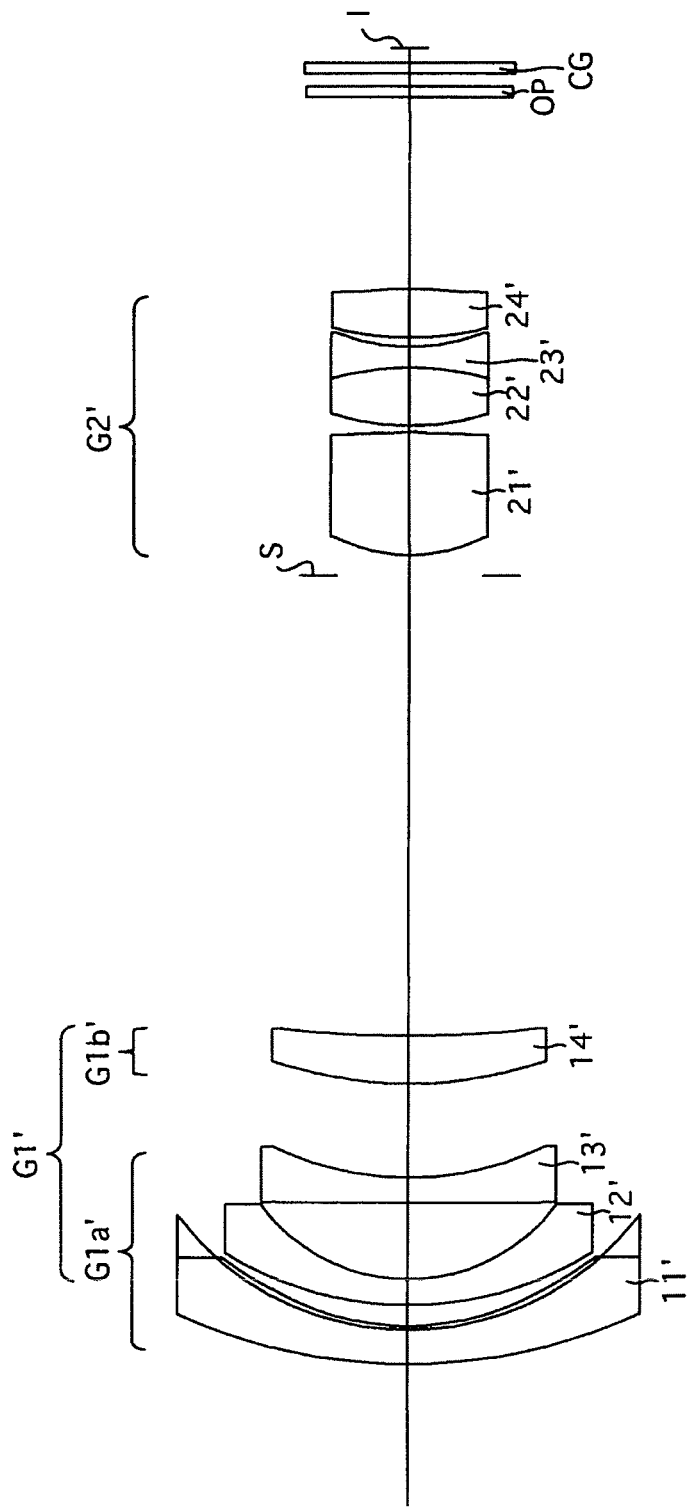
FIG. 30 shows a sixth numerical embodiment of a lens arrangement of a zoom lens system, according to the present invention, when focusing on an object at infinity at the short focal length extremity.

As shown in the lens arrangement of FIG. 30, the first sub-lens group G1a' is configured of a negative lens element 11', negative lens element 12' and a negative lens element 13', in that order from the object side. The negative lens element 11' is a hybrid lens having an aspherical layer made out of a compound resin material adhered onto the image side thereof. The second sub-lens group G1b' is configured of a positive single lens element 14'. The second lens group G2' is configured of a positive lens element 21', a cemented lens provided with a positive lens element 22' and a negative lens element 23'; and a positive lens element 24', in that order from the object side. Each of the positive lens element 21' and the positive lens element 24' has aspherical surfaces on both sides.

In the second embodiment of the zoom lens system, the positive single lens element 14' of the second sub-lens group G1b', which is part of the first lens group G1', constitutes a focusing lens group which is moved along the optical axis direction during a focusing operation. According to this configuration, it is possible to achieve a focusing lens group which is miniaturized and reduced in weight, such that a rapid and quiet focusing operation can be performed; and hence, such a focusing lens group can meet the demands for miniaturization and reduction in weight in, e.g., a mirrorless camera in which an optical finder split mirror is omitted.

In regard to focusing on an object at infinity to an object at a finite distance, the second embodiment of the zoom lens system includes the following distinctive focusing modes: a "normal photography mode", a "shifting mode", and a "macro photography mode". The zoom lens system of the second embodiment can stay in the "macro photography mode" at any focal length, regardless of the focal length to which the zoom lens system has been zoomed. Furthermore, since the positional relationship of the second sub-lens group G1b' with respect to the first sub-lens group G1a' is constant (unchanging) when focused at a predetermined distance, regardless of a change in focal length due to zooming, even if zooming was carried out after focusing on a given object, the focusing state remains, in effect, unchanged.

Figure 46A:
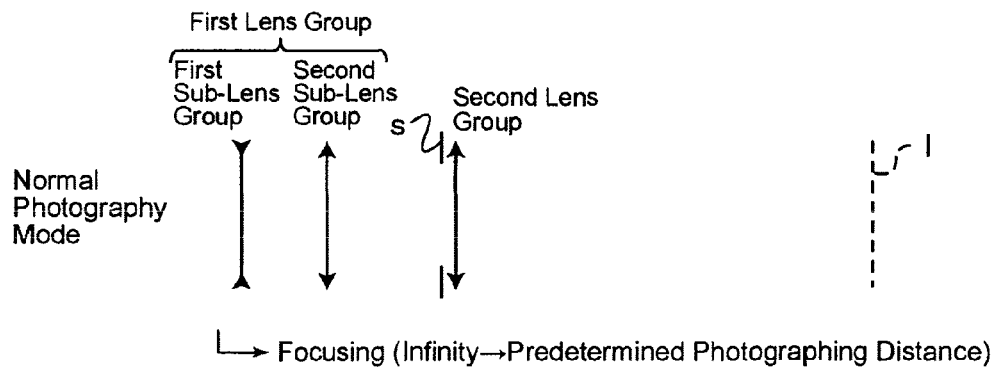
FIG. 46A shows a normal photography mode of the zoom lens system, according to the second embodiment of the present invention, at the long focal length extremity.
Figure 46B:
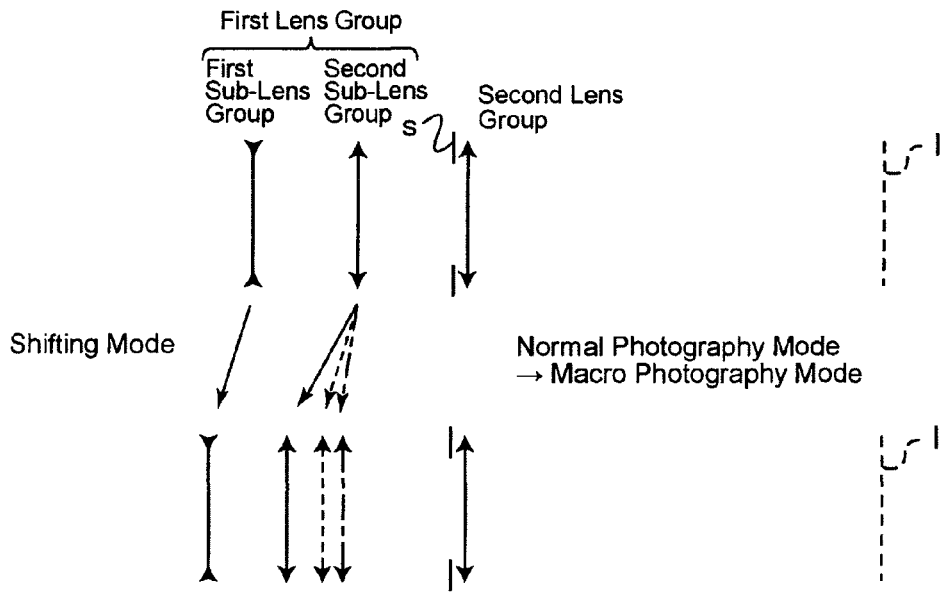
FIG. 46B shows a shifting mode of the second embodiment of the zoom lens system at the long focal length extremity.
Figure 46C:
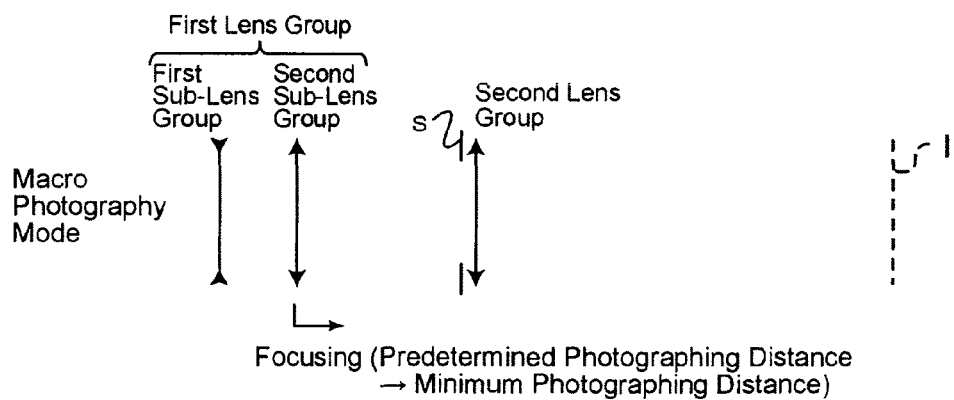
FIG. 46C shows a macro photography mode of the second embodiment of the zoom lens system at the long focal length extremity.

FIGS. 46A, 46B and 46C demonstrates the focusing operation at each photography mode, according to the second embodiment of the present invention, and indicates the lens arrangement with respect to the long focal length extremity.

As shown in FIG. 46A, in the normal photography mode, with the first sub-lens group G1a' remaining stationary (fixed) during an infinite through to a predetermined photographing distance (0.75 m), focusing is carried out by continuously moving the second sub-lens group G1b' away from the stationary first sub-lens group G1a' (toward the image side).

As shown in FIG. 46B, in order to focus on an object located at a distance that is shorter than the predetermined photographing distance (0.75 m) in the normal photography mode, the focusing mode can be shifted from the normal photography mode to the macro photography mode by moving the first sub-lens group G1a' and the second sub-lens group G1b' toward the object side. During this mode-shifting operation, the first sub-lens group G1a' and the second sub-lens group G1b', which are at the predetermined photographing distance (0.75 m), can be both moved toward the object side while decreasing the distance therebetween as shown by the solid line in FIG. 46B; the first sub-lens group G1a' and the second sub-lens group G1b', which are at the predetermined photographing distance (0.75 m), can be moved (the first sub-lens group G1a' and the second sub-lens group G1b' can be integrally moved) toward the object side while maintaining the distance therebetween as shown by the broken line in FIG. 46B; or the first sub-lens group G1a' and the second sub-lens group G1b' can be both moved toward the object side while increasing the distance therebetween as shown by the single-dot chain line in FIG. 46B. Furthermore, as shown in the lens data of each numerical embodiment, if the position of the second sub-lens group G1b' is appropriately controlled in accordance with the movement of the first sub-lens group G1a', it is possible to shift from the normal photography mode to the macro photography mode while remaining at the focused state on an object at a predetermined photographing distance (0.75 m).

As shown in FIG. 46C, in the macro photography mode, with the first sub-lens group G1a remaining stationary, focusing is carried out from the predetermined photographing distance (0.75 m) to the minimum photographing distance (0.35 m) by continuously moving the second sub-lens group G1b' away from the stationary first sub-lens group G1a'.

Accordingly, in the zoom lens system of the first and second embodiments, in regard to focusing on an object at infinity through to an object at a finite distance, by providing the "normal photography mode", the "shifting mode" and the "macro photography mode" as focusing modes and switching between these modes in that order, the focusing lens group (second sub-lens group G1b or G1b') can be miniaturized and reduced in weight, thereby enabling a rapid and silent focusing operation and also successfully achieving a short minimum photographing distance throughout the entire focal length range.

Embodiments

Specific first through sixth numerical embodiments will be herein discussed. In the aberration diagrams and the tables, the d-line, g-line, C-line, F-line and e-line show aberrations at their respective wave-lengths; S designates the sagittal image, M designates the meridional image, Fno. designates the f-number, f designates the focal length of the entire optical system, PM designates the photographic magnification, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν(d) designates the Abbe number with respect to the d-line. The unit used for the various lengths is defined in millimeters (mm). The values for the f-number, the focal length, the photographic magnification, the half angle-of-view, the image height, the backfocus, the overall length of the lens system, and the distance d between lenses (which changes during zooming) are shown in the following order: short focal length extremity, intermediate focal length, and long focal length extremity. "Close 1w" designates a predetermined photographing distance (0.75 m) in a normal photography mode at the short focal length extremity, "Close 2w" designates a predetermined photographing distance (0.75 m) in a macro photography mode at the short focal length extremity, and "Close 3w" designates a minimum photographing distance (0.35 m) in a macro photography mode at the short focal length extremity. "Close 1m" designates a predetermined photographing distance (0.75 m) in a normal photography mode at an intermediate focal length, "Close 2m" designates a predetermined photographing distance (0.75 m) in a macro photography mode at the intermediate focal length, and "Close 3m" designates a minimum photographing distance (0.35 m) in a macro photography mode at the intermediate focal length. "Close 1t" designates a predetermined photographing distance (0.75 m) in a normal photography mode at the long focal length extremity, "Close 2t" designates a predetermined photographing distance (0.75 m) in a macro photography mode at the long focal length extremity, and "Close 3t" designates a minimum photographing distance (0.35 m) in a macro photography mode at the long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
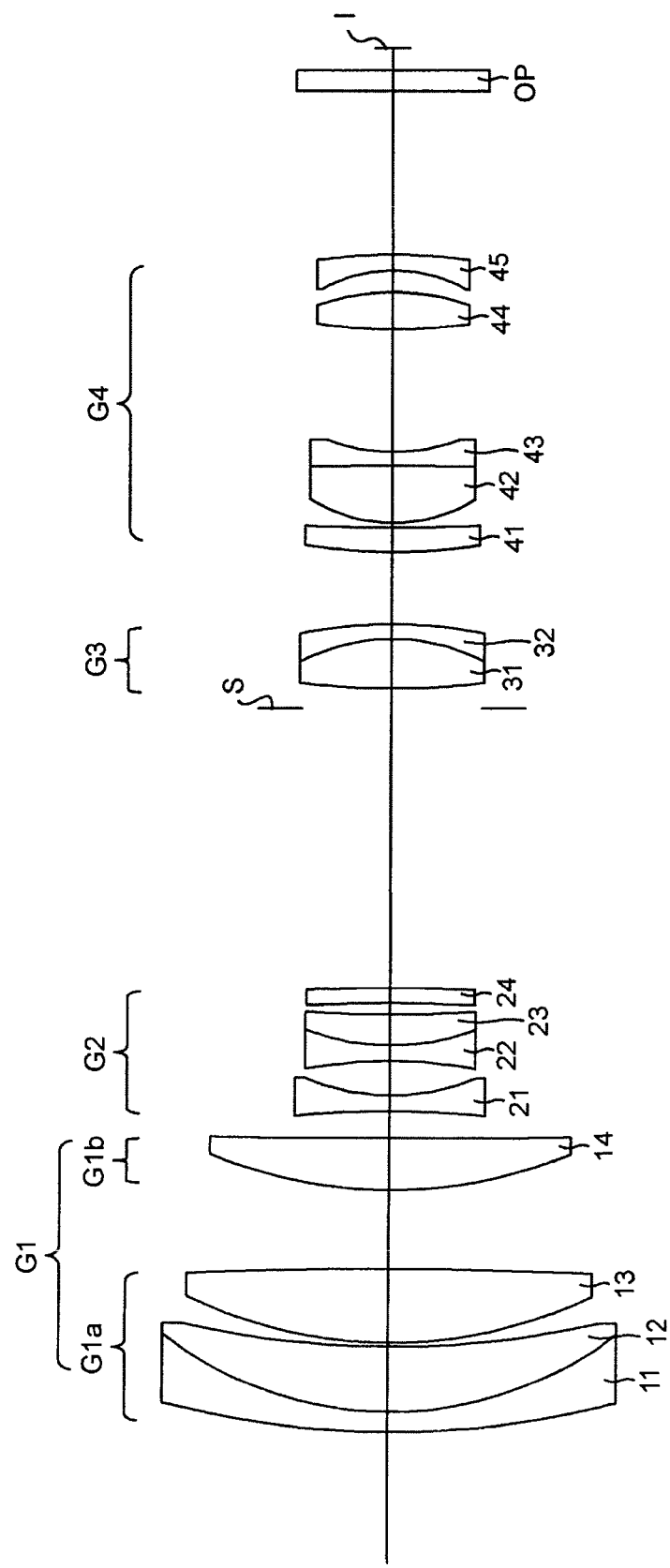
FIG. 1 shows a first numerical embodiment of a lens arrangement of a zoom lens system, according to the present invention, when focusing on an object at infinity at the short focal length extremity.
Figure 8A:
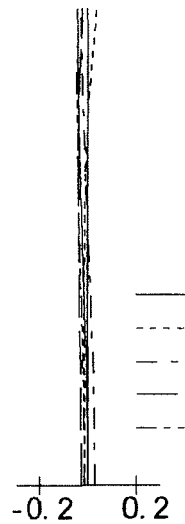
FIGS. 8A, 8B, 8C and 8D show various aberrations that occurred in the zoom lens system of FIG. 1 at an intermediate focal length at a predetermined photographing distance (0.75 m) of a normal photography mode.
Figure 8B:
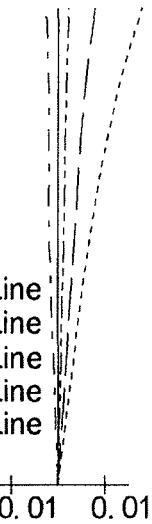
Figure 8C:
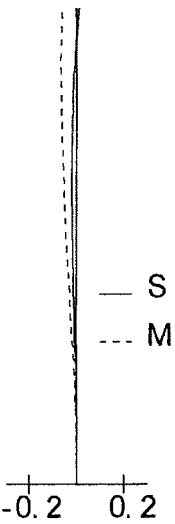
Figure 8D:
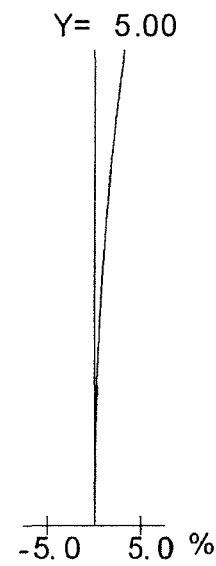
Figure 9A:
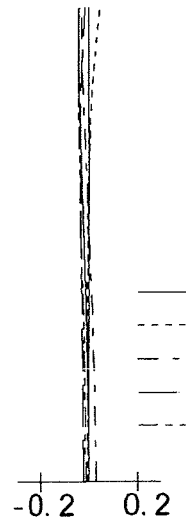
FIGS. 9A, 9B, 9C and 9D show various aberrations that occurred in the zoom lens system of FIG. 1 at an intermediate focal length at a predetermined photographing distance (0.75 m) of a macro photography mode.
Figure 9B:
Figure 9C:
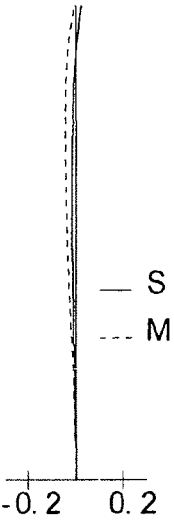
Figure 9D:
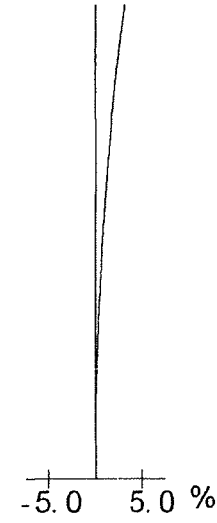

FIGS. 1 through 13D and Tables 1 through 6 show a first numerical embodiment according to the present invention. FIG. 1 shows a lens arrangement of the zoom lens system when focusing on an object at infinity at the short focal length extremity. FIGS. 2A, 2B, 2C and 2D show various aberrations that occurred in the zoom lens system of FIG. 1 at the short focal length extremity when focused on an object at infinity. FIGS. 3A, 3B, 3C and 3D show various aberrations that occurred in the lens arrangement shown in FIG. 1 at an intermediate focal length when focused on an object at infinity. FIGS. 4A, 4B, 4C and 4D show various aberrations that occurred in the lens arrangement shown in FIG. 1 at the long focal length extremity when focused on an object at infinity. FIGS. 5A, 5B, 5C and 5D show various aberrations that occurred in the zoom lens system of FIG. 1 at the short focal length extremity at a predetermined photographing distance (0.75 m) of a normal photography mode. FIGS. 6A, 6B, 6C and 6D show various aberrations that occurred in the zoom lens system of FIG. 1 at the short focal length extremity at a predetermined photographing distance (0.75 m) of a macro photography mode. FIGS. 7A, 7B, 7C and 7D show various aberrations that occurred in the zoom lens system of FIG. 1 at the short focal length extremity at a minimum photographing distance (0.35 m) of a macro photography mode. FIGS. 8A, 8B, 8C and 8D show various aberrations that occurred in the zoom lens system of FIG. 1 at an intermediate focal length at a predetermined photographing distance (0.75 m) of a normal photography mode. FIGS. 9A, 9B, 9C and 9D show various aberrations that occurred in the zoom lens system of FIG. 1 at an intermediate focal length at a predetermined photographing distance (0.75 m) of a macro photography mode. FIGS. 10A, 10B, 10C and 10D show various aberrations that occurred in the zoom lens system of FIG. 1 at an intermediate focal length at a minimum photographing distance (0.35 m) of a macro photography mode. FIGS. 11A, 11B, 11C and 11D show various aberrations that occurred in the zoom lens system of FIG. 1 at the long focal length extremity at a predetermined photographing distance (0.75 m) of a normal photography mode. FIGS. 12A, 12B, 12C and 12D show various aberrations that occurred in the zoom lens system of FIG. 1 at the long focal length extremity at a predetermined photographing distance (0.75 m) of a macro photography mode. FIGS. 13A, 13B, 13C and 13D show various aberrations that occurred in the zoom lens system of FIG. 1 at the long focal length extremity at a minimum photographing distance (0.35 m) of a macro photography mode. Table 1 shows the lens surface data. Table 2 shows various zoom lens system data when focusing on an object at infinity. Table 3 shows each lens-interval (distance) data at a predetermined photographing distance (0.75 m) in a normal photography mode at the short focal length extremity, a predetermined photographing distance (0.75 m) in a macro photography mode at the short focal length extremity, and a minimum photographing distance (0.35 m) in a macro photography mode at the short focal length extremity, respectively. Table 4 shows each lens-interval (distance) data at a predetermined photographing distance (0.75 m) in a normal photography mode at an intermediate focal length, a predetermined photographing distance (0.75 m) in a macro photography mode at the intermediate focal length, and a minimum photographing distance (0.35 m) in a macro photography mode at the intermediate focal length, respectively. Table 5 shows each lens-interval (distance) data at a predetermined photographing distance (0.75 m) in a normal photography mode at the long focal length extremity, a predetermined photographing distance (0.75 m) in a macro photography mode at the long focal length extremity, and a minimum photographing distance (0.35 m) in a macro photography mode at the long focal length extremity, respectively. Table 6 shows the lens group data of the zoom lens system.

The zoom lens system of the first numerical embodiment is configured of a positive first lens group G1, a negative second lens group G2, a positive third lens group G3, and a positive fourth lens group G4, in that order from the object side. The diaphragm S which is provided between the second lens group G2 and the third lens group G3 moves integrally with the third lens group G3 in the optical axis direction. An optical filter OP is provided in between the fourth lens group G4 and the image plane I.

The first lens group G1 is configured of a positive first sub-lens group G1a and a positive second sub-lens group G1b, in that order from the object side. The first sub-lens group G1a is configured of a cemented lens provided with a negative meniscus lens element 11 having a convex surface on the object side and a positive meniscus lens element 12 having a convex surface on the object side; and a biconvex positive lens element 13, in that order from the object side. The second sub-lens group G1b is configured of a positive meniscus lens element 14 having a convex surface on the object side.

The second lens group G2 is configured of a biconcave negative lens element 21, a cemented lens provided with a biconcave negative lens element 22 and a positive meniscus lens element 23 having a convex surface on the object side, and a negative meniscus lens element 24 having a convex surface on the image side in that order from the object side.

The third lens group G3 is configured of a cemented lens having a biconvex positive lens element 31 and a negative meniscus lens element 32 having a convex surface on the image side, in that order from the object side.

The fourth lens group G4 is configured of a positive meniscus lens element 41 having a convex surface on the object side, a cemented lens having a biconvex positive lens element 42 and a biconcave negative lens element 43; a biconvex positive lens element 44, and a negative meniscus lens element 45 having a convex surface on the image side, in that order from the object side.

TABLE 1

SURFACE DATA

| Surf. No. | R | d | N(d) | ν(d) |
|---|---|---|---|---|
| 1 | 46.480 | 1.000 | 1.80691 | 42.2 |
| 2 | 18.884 | 3.317 | 1.48749 | 70.2 |
| 3 | 48.011 | 0.200 | | |
| 4 | 23.834 | 3.752 | 1.49700 | 81.6 |
| 5 | −231.525 | 4.000 | | |
| 6 | 24.550 | 2.587 | 1.49700 | 81.6 |
| 7 | 708.256 | d7 | | |
| 8 | −49.075 | 0.800 | 1.80400 | 44.9 |
| 9 | 11.341 | 1.712 | | |
| 10 | −23.633 | 0.800 | 1.48749 | 70.2 |
| 11 | 12.098 | 1.561 | 1.84666 | 23.8 |
| 12 | 74.468 | 0.582 | | |
| 13 | −70.915 | 0.750 | 1.72916 | 54.7 |
| 14 | −128.660 | d14 | | |
| 15(Diaphragm) | ∞ | 1.000 | | |
| 16 | 36.685 | 2.511 | 1.65005 | 51.3 |
| 17 | −10.100 | 0.750 | 1.80518 | 25.4 |
| 18 | −23.483 | d18 | | |
| 19 | 29.337 | 1.216 | 1.77250 | 49.6 |
| 20 | 87.330 | 0.250 | | |
| 21 | 7.965 | 2.850 | 1.49700 | 81.6 |
| 22 | −728.652 | 0.750 | 1.65844 | 50.9 |
| 23 | 9.409 | 6.196 | | |
| 24 | 28.374 | 1.850 | 1.60562 | 43.7 |
| 25 | −11.812 | 1.091 | | |
| 26 | −7.633 | 0.800 | 1.80100 | 35.0 |
| 27 | −27.980 | 8.200 | | |
| 28 | ∞ | 1.050 | 1.51633 | 64.1 |
| 29 | ∞ | — | | |

TABLE 2

ZOOM LENS SYSTEM DATA
Zoom Ratio 2.94

| | Short Focal Length Extremity | Intermediate Focal Length | Long Focal Length Extremity |
|---|---|---|---|
| FNO. | 2.9 | 2.8 | 2.9 |
| f | 15.30 | 28.00 | 45.00 |
| PM | 0.000 | 0.000 | 0.000 |
| W | 18.5 | 9.8 | 6.1 |
| Y | 5.00 | 5.00 | 5.00 |
| fB | 1.11 | 1.11 | 1.11 |
| L | 69.99 | 69.99 | 69.99 |
| d5 | 4.000 | 4.000 | 4.000 |
| d7 | 1.400 | 8.361 | 11.120 |
| d14 | 14.214 | 8.215 | 0.786 |
| d18 | 3.694 | 2.731 | 7.401 |

TABLE 3

|  | Close 1 w | Close 2 w | Close 3 w |
|---|---|---|---|
| PM | −0.023 | −0.023 | −0.059 |
| fB | 1.11 | 1.11 | 1.11 |
| L | 69.99 | 71.57 | 71.57 |
| d5 | 2.133 | 4.000 | 1.166 |
| d7 | 3.267 | 2.982 | 5.816 |
| d14 | 14.214 | 14.214 | 14.214 |
| d18 | 3.694 | 3.694 | 3.694 |

TABLE 4

|  | Close 1 m | Close 2 m | Close 3 m |
|---|---|---|---|
| PM | −0.042 | −0.043 | −0.108 |
| fB | 1.11 | 1.11 | 1.11 |
| L | 69.99 | 71.57 | 71.57 |
| d5 | 2.133 | 4.000 | 1.166 |
| d7 | 10.229 | 9.943 | 12.777 |
| d14 | 14.214 | 14.214 | 14.214 |
| d18 | 3.694 | 3.694 | 3.694 |

TABLE 5

|  | Close 1 t | Close 2 t | Close 3 t |
|---|---|---|---|
| PM | −0.068 | −0.069 | −0.174 |
| fB | 1.11 | 1.11 | 1.11 |
| L | 69.99 | 71.57 | 71.57 |
| d5 | 2.133 | 4.000 | 1.166 |
| d7 | 12.988 | 12.702 | 15.536 |
| d14 | 14.214 | 14.214 | 14.214 |
| d18 | 3.694 | 3.694 | 3.694 |

TABLE 6

LENS GROUP DATA

| Lens Group | 1$^{st}$ Surf. | Focal Length |
|---|---|---|
| 1 | 1 | 32.14 |
| 1a | 1 | 75.22 |
| 1b | 6 | 51.11 |
| 2 | 8 | −10.42 |
| 3 | 16 | 27.70 |
| 4 | 19 | 36.78 |

Numerical Embodiment 2

Figure 14:
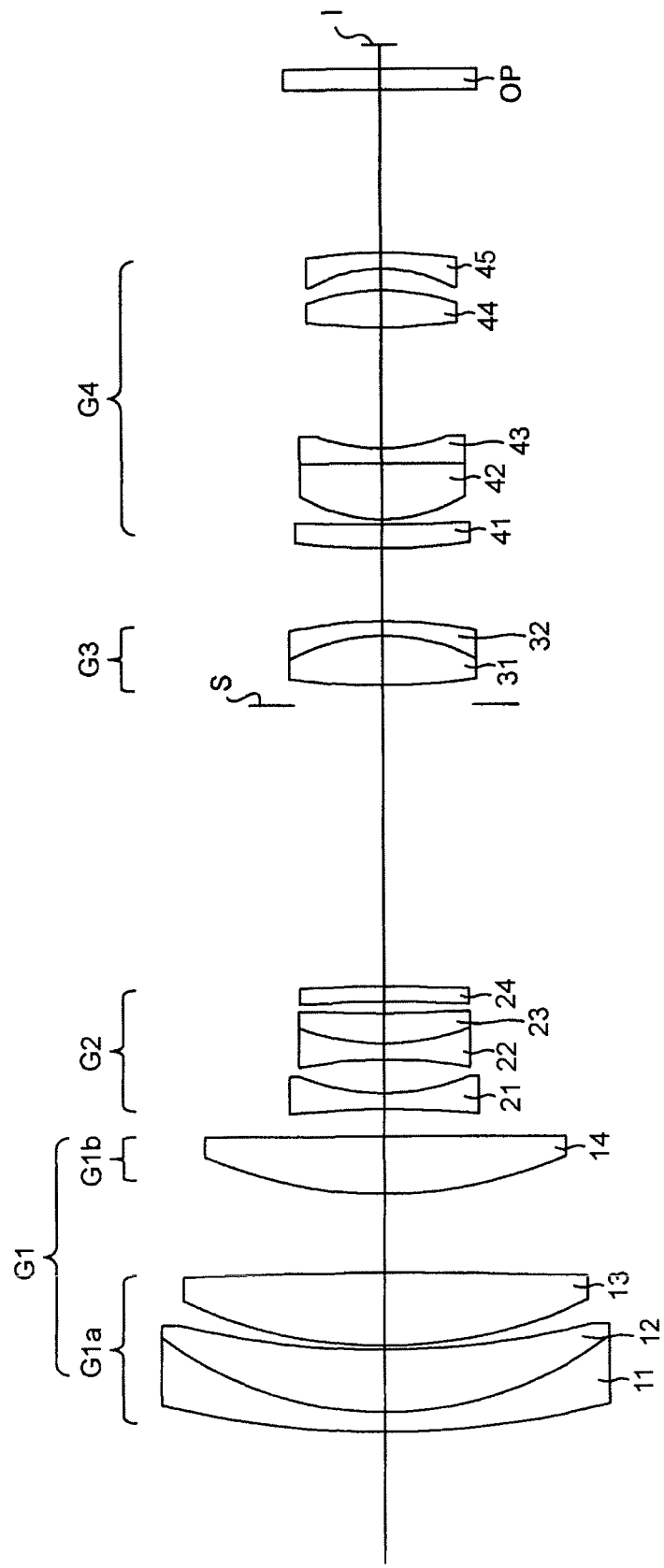
FIG. 14 shows a second numerical embodiment of a lens arrangement of a zoom lens system, according to the present invention, when focusing on an object at infinity at the short focal length extremity.

FIGS. 14 through 17D and Tables 7 through 12 show a second numerical embodiment according to the present invention. FIG. 14 shows a lens arrangement of the zoom lens system when focusing on an object at infinity at the short focal length extremity. FIGS. 15A, 15B, 15C and 15D show various aberrations that occurred in the zoom lens system of FIG. 14 at the short focal length extremity when focused on an object at infinity. FIGS. 16A, 16B, 16C and 16D show various aberrations that occurred in the lens arrangement shown in FIG. 14 at an intermediate focal length when focused on an object at infinity. FIGS. 17A, 17B, 17C and 17D show various aberrations that occurred in the lens arrangement shown in FIG. 14 at the long focal length extremity when focused on an object at infinity. Table 7 shows the lens surface data. Table 8 shows various zoom lens system data when focusing on an object at infinity. Table 9 shows each lens-interval (distance) data at a predetermined photographing distance (0.75 m) in a normal photography mode at the short focal length extremity, a predetermined photographing distance (0.75 m) in a macro photography mode at the short focal length extremity, and a minimum photographing distance (0.35 m) in a macro photography mode at the short focal length extremity, respectively. Table 10 shows each lens-interval (distance) data at a predetermined photographing distance (0.75 m) in a normal photography mode at an intermediate focal length, a predetermined photographing distance (0.75 m) in a macro photography mode at the intermediate focal length, and a minimum photographing distance (0.35 m) in a macro photography mode at the intermediate focal length, respectively. Table 11 shows each lens-interval (distance) data at a predetermined photographing distance (0.75 m) in a normal photography mode at the long focal length extremity, a predetermined photographing distance (0.75 m) in a macro photography mode at the long focal length extremity, and a minimum photographing distance (0.35 m) in a macro photography mode at the long focal length extremity, respectively. Table 12 shows the lens group data of the zoom lens system.

The fundamental lens arrangement of the second numerical embodiment is the same as that of the first numerical embodiment except for the following (1):

(1) The second sub-lens group G1$b$ of the first lens group G1 is configured of a biconvex positive single lens element 14.

TABLE 7

SURFACE DATA

| Surf. No. | R | d | N(d) | ν(d) |
|---|---|---|---|---|
| 1 | 47.190 | 1.000 | 1.81369 | 42.5 |
| 2 | 18.894 | 3.159 | 1.48749 | 70.2 |
| 3 | 43.258 | 0.200 |  |  |
| 4 | 24.108 | 3.694 | 1.49700 | 81.6 |
| 5 | −256.528 | 4.000 |  |  |
| 6 | 23.152 | 2.894 | 1.49700 | 81.6 |
| 7 | −10615.414 | d7 |  |  |
| 8 | −49.322 | 0.800 | 1.79942 | 45.1 |
| 9 | 11.348 | 1.712 |  |  |
| 10 | −24.186 | 0.800 | 1.48749 | 70.2 |
| 11 | 12.180 | 1.561 | 1.84666 | 23.8 |
| 12 | 73.129 | 0.582 |  |  |
| 13 | −71.785 | 0.750 | 1.72916 | 54.7 |
| 14 | −126.616 | d14 |  |  |
| 15(Diaphragm) | ∞ | 1.000 |  |  |
| 16 | 36.386 | 2.511 | 1.65004 | 51.5 |
| 17 | −10.172 | 0.750 | 1.80518 | 25.4 |
| 18 | −23.529 | d18 |  |  |
| 19 | 29.464 | 1.216 | 1.77250 | 49.6 |
| 20 | 86.359 | 0.250 |  |  |
| 21 | 7.957 | 2.850 | 1.49700 | 81.6 |
| 22 | −1525.334 | 0.750 | 1.65844 | 50.9 |
| 23 | 9.403 | 6.140 |  |  |
| 24 | 28.810 | 1.850 | 1.60562 | 43.7 |
| 25 | −11.809 | 1.091 |  |  |
| 26 | −7.616 | 0.800 | 1.80100 | 35.0 |
| 27 | −28.853 | 8.200 |  |  |
| 28 | ∞ | 1.050 | 1.51633 | 64.1 |
| 29 | ∞ | — |  |  |

TABLE 8

ZOOM LENS SYSTEM DATA
Zoom Ratio 2.88

|  | Short Focal Length Extremity | Intermediate Focal Length | Long Focal Length Extremity |
|---|---|---|---|
| FNO. | 2.9 | 2.8 | 2.9 |
| f | 15.28 | 28.00 | 44.00 |
| PM | 0.000 | 0.000 | 0.000 |

TABLE 8-continued

ZOOM LENS SYSTEM DATA
Zoom Ratio 2.88

|  | Short Focal Length Extremity | Intermediate Focal Length | Long Focal Length Extremity |
|---|---|---|---|
| W | 18.6 | 9.9 | 6.3 |
| Y | 5.00 | 5.00 | 5.03 |
| fB | 1.11 | 1.11 | 1.11 |
| L | 70.16 | 70.16 | 70.16 |
| d5 | 4.000 | 4.000 | 4.000 |
| d7 | 1.400 | 8.422 | 11.071 |
| d14 | 14.337 | 8.246 | 1.145 |
| d18 | 3.709 | 2.779 | 7.231 |

TABLE 9

|  | Close 1 w | Close 2 w | Close 3 w |
|---|---|---|---|
| PM | −0.023 | −0.023 | −0.059 |
| fB | 1.11 | 1.11 | 1.11 |
| L | 70.16 | 71.74 | 71.74 |
| d5 | 2.234 | 4.000 | 1.317 |
| d7 | 3.157 | 2.973 | 5.655 |
| d14 | 14.337 | 14.337 | 14.337 |
| d18 | 3.709 | 3.709 | 3.709 |

TABLE 10

|  | Close 1 m | Close 2 m | Close 3 m |
|---|---|---|---|
| PM | −0.042 | −0.043 | −0.109 |
| fB | 1.11 | 1.11 | 1.11 |
| L | 70.16 | 71.74 | 71.74 |
| d5 | 2.243 | 4.000 | 1.317 |
| d7 | 10.179 | 9.995 | 12.677 |
| d14 | 14.337 | 14.337 | 14.337 |
| d18 | 3.709 | 3.709 | 3.709 |

TABLE 11

|  | Close 1 t | Close 2 t | Close 3 t |
|---|---|---|---|
| PM | −0.066 | −0.067 | −0.171 |
| fB | 1.11 | 1.11 | 1.11 |
| L | 70.16 | 71.74 | 71.74 |
| d5 | 2.243 | 4.000 | 1.318 |
| d7 | 12.828 | 12.643 | 15.325 |
| d14 | 14.337 | 14.337 | 14.337 |
| d18 | 3.709 | 3.709 | 3.709 |

TABLE 12

LENS GROUP DATA

| Lens Group | 1$^{st}$ Surf. | Focal Length |
|---|---|---|
| 1 | 1 | 32.06 |
| 1a | 1 | 88.34 |
| 1b | 6 | 46.49 |
| 2 | 8 | −10.52 |
| 3 | 16 | 27.57 |
| 4 | 19 | 38.08 |

Numerical Embodiment 3

Figure 18:
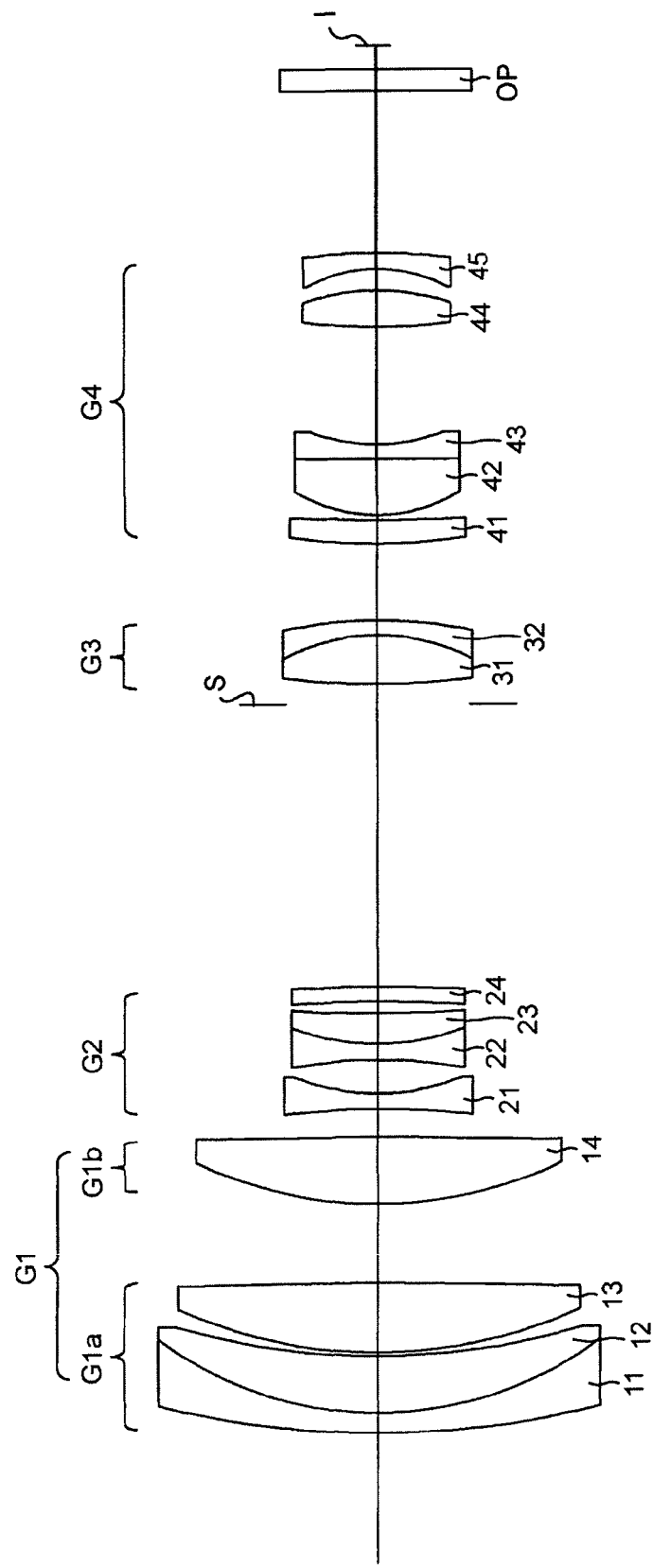
FIG. 18 shows a third numerical embodiment of a lens arrangement of a zoom lens system, according to the present invention, when focusing on an object at infinity at the short focal length extremity.

FIGS. 18 through 21D and Tables 13 through 18 show a third numerical embodiment according to the present invention. FIG. 18 shows a lens arrangement of the zoom lens system when focusing on an object at infinity at the short focal length extremity. FIGS. 19A, 19B, 19C and 19D show various aberrations that occurred in the zoom lens system of FIG. 18 at the short focal length extremity when focused on an object at infinity. FIGS. 20A, 20B, 20C and 20D show various aberrations that occurred in the lens arrangement shown in FIG. 18 at an intermediate focal length when focused on an object at infinity. FIGS. 21A, 21B, 21C and 21D show various aberrations that occurred in the lens arrangement shown in FIG. 18 at the long focal length extremity when focused on an object at infinity. Table 13 shows the lens surface data. Table 14 shows various zoom lens system data when focusing on an object at infinity. Table 15 shows each lens-interval (distance) data at a predetermined photographing distance (0.75 m) in a normal photography mode at the short focal length extremity, a predetermined photographing distance (0.75 m) in a macro photography mode at the short focal length extremity, and a minimum photographing distance (0.35 m) in a macro photography mode at the short focal length extremity, respectively. Table 16 shows each lens-interval (distance) data at a predetermined photographing distance (0.75 m) in a normal photography mode at an intermediate focal length, a predetermined photographing distance (0.75 m) in a macro photography mode at the intermediate focal length, and a minimum photographing distance (0.35 m) in a macro photography mode at the intermediate focal length, respectively. Table 17 shows each lens-interval (distance) data at a predetermined photographing distance (0.75 m) in a normal photography mode at the long focal length extremity, a predetermined photographing distance (0.75 m) in a macro photography mode at the long focal length extremity, and a minimum photographing distance (0.35 m) in a macro photography mode at the long focal length extremity, respectively. Table 18 shows the lens group data of the zoom lens system.

The fundamental lens arrangement of the third numerical embodiment is the same as that of the first numerical embodiment except for the following (1) and (2):

(1) The second sub-lens group G1b of the first lens group G1 is a biconvex positive single lens element 14.

(2) In the fourth lens group G4, the positive lens element 42 is a positive meniscus lens element having a convex surface on the object side, and the negative lens element 43 is a negative meniscus lens element having a convex surface on the object side.

TABLE 13

SURFACE DATA

| Surf. No. | R | d | N(d) | ν(d) |
|---|---|---|---|---|
| 1 | 47.571 | 1.000 | 1.81392 | 44.7 |
| 2 | 18.851 | 2.885 | 1.49700 | 81.6 |
| 3 | 36.211 | 0.200 |  |  |
| 4 | 24.973 | 3.551 | 1.49700 | 81.6 |
| 5 | −328.838 | 4.000 |  |  |
| 6 | 21.818 | 3.386 | 1.49700 | 81.6 |
| 7 | −373.110 | d7 |  |  |
| 8 | −46.440 | 0.800 | 1.79196 | 44.2 |
| 9 | 11.456 | 1.712 |  |  |
| 10 | −25.268 | 0.800 | 1.48749 | 70.2 |
| 11 | 12.217 | 1.561 | 1.84666 | 23.8 |
| 12 | 73.003 | 0.582 |  |  |
| 13 | −75.747 | 0.750 | 1.72916 | 54.7 |
| 14 | −116.222 | d14 |  |  |
| 15 (Diaphragm) | ∞ | 1.000 |  |  |
| 16 | 35.766 | 2.511 | 1.65001 | 51.7 |
| 17 | −10.279 | 0.750 | 1.80518 | 25.4 |

TABLE 13-continued

SURFACE DATA

| Surf. No. | R | d | N(d) | ν(d) |
|---|---|---|---|---|
| 18 | −23.665 | d18 | | |
| 19 | 29.716 | 1.216 | 1.77250 | 49.6 |
| 20 | 84.709 | 0.250 | | |
| 21 | 7.939 | 2.850 | 1.49700 | 81.6 |
| 22 | 1153.092 | 0.750 | 1.65844 | 50.9 |
| 23 | 9.397 | 5.956 | | |
| 24 | 29.570 | 1.850 | 1.60562 | 43.7 |
| 25 | −11.779 | 1.091 | | |
| 26 | −7.581 | 0.800 | 1.80100 | 35.0 |
| 27 | −30.795 | 8.200 | | |
| 28 | ∞ | 1.050 | 1.51633 | 64.1 |
| 29 | ∞ | — | | |

TABLE 14

ZOOM LENS SYSTEM DATA
Zoom Ratio 2.88

| | Short Focal Length Extremity | Intermediate Focal Length | Long Focal Length Extremity |
|---|---|---|---|
| FNO. | 2.9 | 2.9 | 2.9 |
| f | 15.30 | 28.00 | 44.00 |
| PM | 0.000 | 0.000 | 0.000 |
| W | 18.6 | 9.9 | 6.2 |
| Y | 5.00 | 5.00 | 5.00 |
| fB | 1.14 | 1.14 | 1.14 |
| L | 70.40 | 70.40 | 70.40 |
| d5 | 4.000 | 4.000 | 4.000 |
| d7 | 1.400 | 8.705 | 11.403 |
| d14 | 14.466 | 8.257 | 1.010 |
| d18 | 3.897 | 2.801 | 7.350 |

TABLE 15

| | Close 1 w | Close 2 w | Close 3 w |
|---|---|---|---|
| PM | −0.023 | −0.023 | −0.060 |
| fB | 1.14 | 1.14 | 1.14 |
| L | 70.40 | 72.02 | 72.02 |
| d5 | 2.303 | 4.000 | 1.377 |
| d7 | 3.097 | 3.017 | 5.640 |
| d14 | 14.466 | 14.466 | 14.466 |
| d18 | 3.897 | 3.897 | 3.897 |

TABLE 16

| | Close 1 m | Close 2 m | Close 3 m |
|---|---|---|---|
| PM | −0.042 | −0.043 | −0.109 |
| fB | 1.14 | 1.14 | 1.14 |
| L | 70.40 | 72.02 | 72.02 |
| d5 | 2.303 | 4.000 | 1.377 |
| d7 | 10.403 | 10.322 | 12.945 |
| d14 | 14.466 | 14.466 | 14.466 |
| d18 | 3.897 | 3.897 | 3.897 |

TABLE 17

| | Close 1 t | Close 2 t | Close 3 t |
|---|---|---|---|
| PM | −0.067 | −0.067 | −0.172 |
| fB | 1.14 | 1.14 | 1.14 |
| L | 70.40 | 72.02 | 72.02 |
| d5 | 2.303 | 4.000 | 1.377 |
| d7 | 13.100 | 13.020 | 15.642 |
| d14 | 14.466 | 14.466 | 14.466 |
| d18 | 3.897 | 3.897 | 3.897 |

TABLE 18

LENS GROUP DATA

| Lens Group | 1st Surf. | Focal Length |
|---|---|---|
| 1 | 1 | 32.49 |
| 1a | 1 | 123.50 |
| 1b | 6 | 41.59 |
| 2 | 8 | −10.84 |
| 3 | 16 | 27.38 |
| 4 | 19 | 40.58 |

Numerical Embodiment 4

Figure 22:
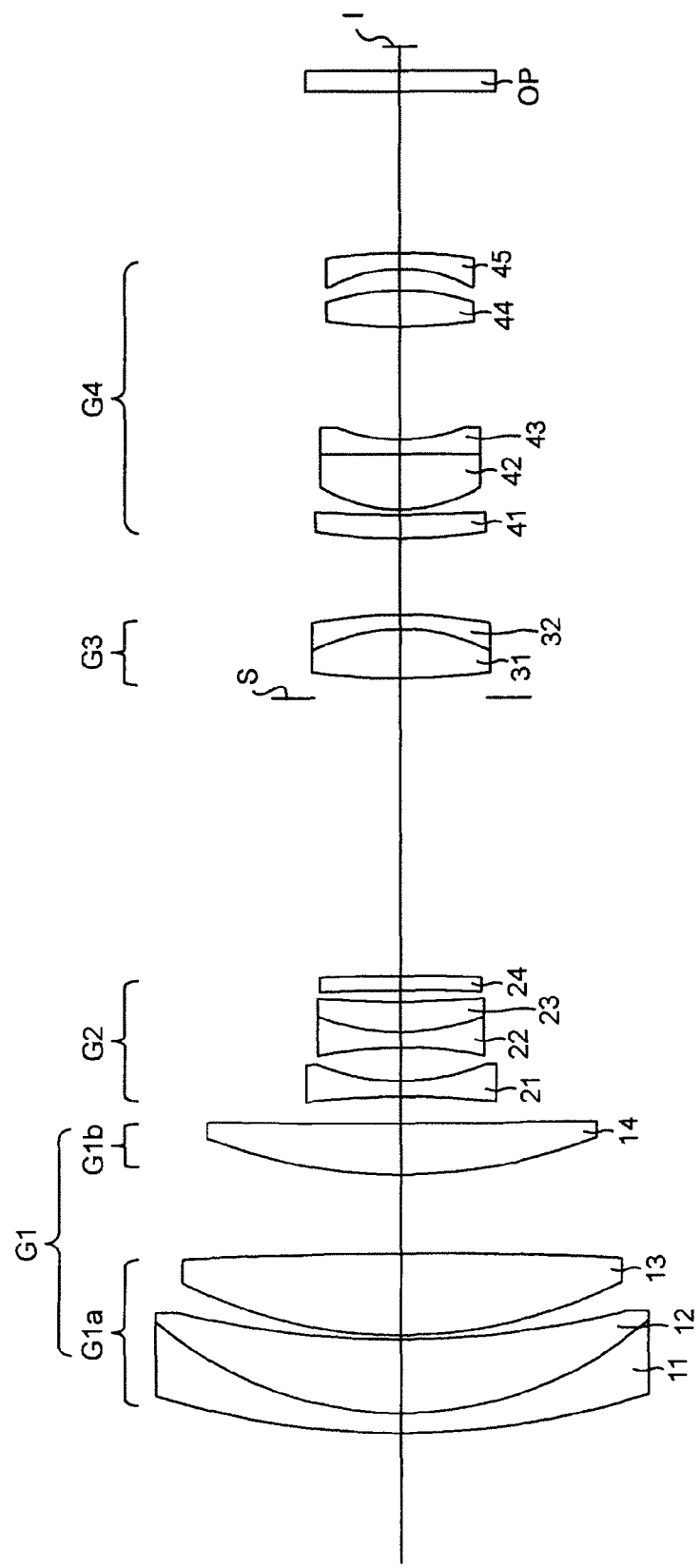
FIG. 22 shows a fourth numerical embodiment of a lens arrangement of a zoom lens system, according to the present invention, when focusing on an object at infinity at the short focal length extremity.

FIGS. 22 through 25D and Tables 19 through 24 show a fourth numerical embodiment according to the present invention. FIG. 22 shows a lens arrangement of the zoom lens system when focusing on an object at infinity at the short focal length extremity. FIGS. 23A, 23B, 23C and 23D show various aberrations that occurred in the zoom lens system of FIG. 22 at the short focal length extremity when focused on an object at infinity. FIGS. 24A, 24B, 24C and 24D show various aberrations that occurred in the lens arrangement shown in FIG. 22 at an intermediate focal length when focused on an object at infinity. FIGS. 25A, 25B, 25C and 25D show various aberrations that occurred in the lens arrangement shown in FIG. 22 at the long focal length extremity when focused on an object at infinity. Table 19 shows the lens surface data. Table 20 shows various zoom lens system data when focusing on an object at infinity. Table 21 shows each lens-interval (distance) data at a predetermined photographing distance (0.75 m) in a normal photography mode at the short focal length extremity, a predetermined photographing distance (0.75 m) in a macro photography mode at the short focal length extremity, and a minimum photographing distance (0.35 m) in a macro photography mode at the short focal length extremity, respectively. Table 22 shows each lens-interval (distance) data at a predetermined photographing distance (0.75 m) in a normal photography mode at an intermediate focal length, a predetermined photographing distance (0.75 m) in a macro photography mode at the intermediate focal length, and a minimum photographing distance (0.35 m) in a macro photography mode at the intermediate focal length, respectively. Table 23 shows each lens-interval (distance) data at a predetermined photographing distance (0.75 m) in a normal photography mode at the long focal length extremity, a predetermined photographing distance (0.75 m) in a macro photography mode at the long focal length extremity, and a minimum photographing distance (0.35 m) in a macro photography mode at the long focal length extremity, respectively. Table 24 shows the lens group data of the zoom lens system.

The fundamental lens arrangement of the fourth numerical embodiment is the same as that of the first numerical embodiment except for the following (1):

(1) In the fourth lens group G4, the positive lens element 42 is a positive meniscus lens element having a convex surface on the object side, and the negative lens element 43 is a negative meniscus lens element having a convex surface on the object side.

TABLE 19

SURFACE DATA

| Surf. No. | R | d | N(d) | ν(d) |
|---|---|---|---|---|
| 1 | 42.303 | 1.000 | 1.79563 | 39.9 |
| 2 | 19.268 | 3.781 | 1.49700 | 81.6 |
| 3 | 48.083 | 0.200 | | |
| 4 | 24.523 | 4.215 | 1.48749 | 70.2 |
| 5 | −250.000 | 4.000 | | |
| 6 | 27.212 | 2.592 | 1.49700 | 81.6 |
| 7 | 402.644 | d7 | | |
| 8 | −47.020 | 0.800 | 1.80400 | 46.9 |
| 9 | 11.717 | 1.712 | | |
| 10 | −21.364 | 0.800 | 1.48749 | 70.2 |
| 11 | 12.332 | 1.561 | 1.84666 | 23.8 |
| 12 | 64.936 | 0.582 | | |
| 13 | −82.104 | 0.750 | 1.72916 | 54.7 |
| 14 | −102.924 | d14 | | |
| 15 (Diaphragm) | ∞ | 1.000 | | |
| 16 | 35.000 | 2.511 | 1.65011 | 50.2 |
| 17 | −10.040 | 0.750 | 1.80518 | 25.4 |
| 18 | −24.445 | d18 | | |
| 19 | 29.490 | 1.216 | 1.77250 | 49.6 |
| 20 | 86.811 | 0.250 | | |
| 21 | 7.898 | 2.850 | 1.49700 | 81.6 |
| 22 | 2095.896 | 0.750 | 1.65844 | 50.9 |
| 23 | 9.445 | 5.751 | | |
| 24 | 26.950 | 1.850 | 1.60562 | 43.7 |
| 25 | −11.864 | 1.091 | | |
| 26 | −7.547 | 0.800 | 1.80100 | 35.0 |
| 27 | −26.628 | 8.200 | | |
| 28 | ∞ | 1.050 | 1.51633 | 64.1 |
| 29 | ∞ | — | | |

TABLE 20

ZOOM LENS SYSTEM DATA
Zoom Ratio 2.94

| | Short Focal Length Extremity | Intermediate Focal Length | Long Focal Length Extremity |
|---|---|---|---|
| FNO. | 2.9 | 2.8 | 2.9 |
| f | 15.30 | 28.00 | 45.00 |
| PM | 0.000 | 0.000 | 0.000 |
| W | 18.6 | 9.9 | 6.1 |
| Y | 5.00 | 5.00 | 5.00 |
| fB | 1.30 | 1.30 | 1.30 |
| L | 70.93 | 70.93 | 70.93 |
| d5 | 4.000 | 4.000 | 4.000 |
| d7 | 1.400 | 8.589 | 11.460 |
| d14 | 14.255 | 8.404 | 1.091 |
| d18 | 3.919 | 2.581 | 7.022 |

TABLE 21

| | Close 1 w | Close 2 w | Close 3 w |
|---|---|---|---|
| PM | −0.023 | −0.024 | −0.060 |
| fB | 1.30 | 1.30 | 1.30 |
| L | 70.93 | 72.66 | 72.66 |
| d5 | 1.824 | 4.000 | 0.691 |
| d7 | 3.576 | 3.122 | 6.431 |
| d14 | 14.255 | 14.255 | 14.255 |
| d18 | 3.919 | 3.919 | 3.919 |

TABLE 22

| | Close 1 m | Close 2 m | Close 3 m |
|---|---|---|---|
| PM | −0.042 | −0.043 | −0.109 |
| fB | 1.30 | 1.30 | 1.30 |
| L | 70.93 | 72.66 | 72.66 |
| d5 | 1.824 | 4.000 | 0.693 |
| d7 | 10.765 | 10.311 | 13.618 |
| d14 | 14.255 | 14.255 | 14.255 |
| d18 | 3.919 | 3.919 | 3.919 |

TABLE 23

| | Close 1 t | Close 2 t | Close 3 t |
|---|---|---|---|
| PM | −0.068 | −0.069 | −0.175 |
| fB | 1.30 | 1.30 | 1.30 |
| L | 70.93 | 72.66 | 72.66 |
| d5 | 1.824 | 4.000 | 0.693 |
| d7 | 13.637 | 13.183 | 16.490 |
| d14 | 14.255 | 14.255 | 14.255 |
| d18 | 3.919 | 3.919 | 3.919 |

TABLE 24

LENS GROUP DATA

| Lens Group | 1st Surf. | Focal Length |
|---|---|---|
| 1 | 1 | 33.48 |
| 1a | 1 | 68.022 |
| 1b | 6 | 58.588 |
| 2 | 8 | −10.42 |
| 3 | 16 | 28.15 |
| 4 | 19 | 34.57 |

Numerical Embodiment 5

Figure 26:
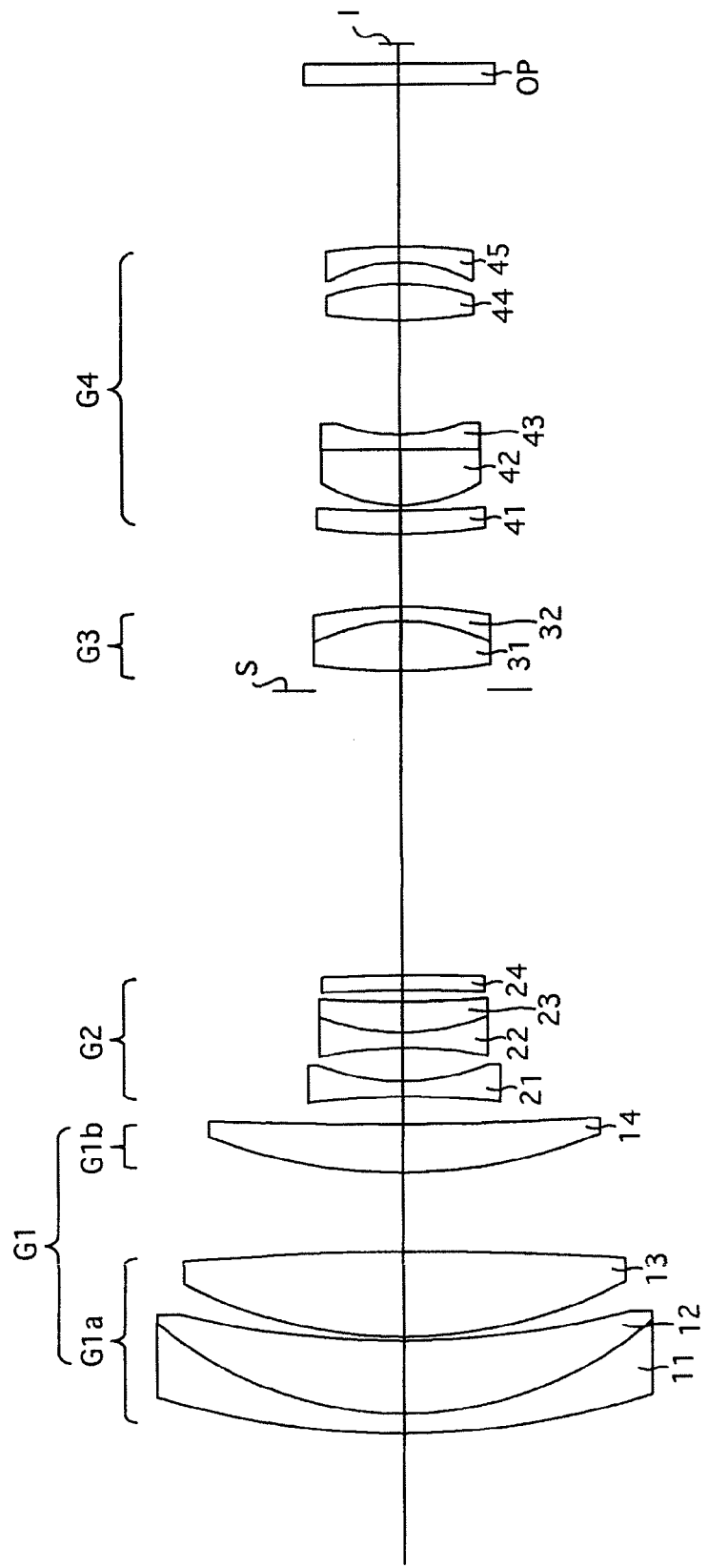
FIG. 26 shows a fifth numerical embodiment of a lens arrangement of a zoom lens system, according to the present invention, when focusing on an object at infinity at the short focal length extremity.

FIGS. 26 through 29D and Tables 25 through 30 show a fifth numerical embodiment according to the present invention. FIG. 26 shows a lens arrangement of the zoom lens system when focusing on an object at infinity at the short focal length extremity. FIGS. 27A, 27B, 27C and 27D show various aberrations that occurred in the zoom lens system of FIG. 26 at the short focal length extremity when focused on an object at infinity. FIGS. 28A, 28B, 28C and 28D show various aberrations that occurred in the lens arrangement shown in FIG. 26 at an intermediate focal length when focused on an object at infinity. FIGS. 29A, 29B, 29C and 29D show various aberrations that occurred in the lens arrangement shown in FIG. 26 at the long focal length extremity when focused on an object at infinity. Table 25 shows the lens surface data. Table 26 shows various zoom lens system data when focusing on an object at infinity. Table 27 shows each lens-interval (distance) data at a predetermined photographing distance (0.75 m) in a normal photography mode at the short focal length extremity, a predetermined photographing distance (0.75 m) in a macro photography mode at the short focal length extremity, and a minimum photographing distance (0.35 m) in a macro photography mode at the short focal length extremity, respectively. Table 28 shows each lens-interval (distance) data at a predetermined photographing distance (0.75 m) in a normal photography mode at an intermediate focal length, a predetermined photographing distance (0.75 m) in a macro photography mode at the intermediate focal length, and a minimum photographing distance (0.35 m) in a macro photography mode at the intermediate focal length, respectively. Table 29 shows each lens-interval (distance) data at a predetermined photographing distance (0.75 m) in a normal photography mode at the long focal length extremity, a predetermined photographing distance (0.75 m) in a macro photography mode at the long focal length extremity, and a minimum photographing distance (0.35 m) in a macro photography mode at the long focal length extremity, respectively. Table 30 shows the lens group data of the zoom lens system.

The fundamental lens arrangement of the fifth numerical embodiment is the same as that of the fourth numerical embodiment.

TABLE 25

SURFACE DATA

| Surf. No. | R | d | N (d) | ν (d) |
|---|---|---|---|---|
| 1 | 42.545 | 1.000 | 1.79329 | 40.0 |
| 2 | 19.309 | 3.741 | 1.49700 | 81.6 |
| 3 | 47.301 | 0.200 | | |
| 4 | 24.453 | 4.364 | 1.48749 | 70.2 |
| 5 | −157.601 | 4.000 | | |
| 6 | 27.032 | 2.472 | 1.49700 | 81.6 |
| 7 | 183.990 | d7 | | |
| 8 | −45.921 | 0.800 | 1.79997 | 45.9 |
| 9 | 11.926 | 1.712 | | |
| 10 | −22.080 | 0.800 | 1.48749 | 70.2 |
| 11 | 12.377 | 1.561 | 1.84666 | 23.8 |
| 12 | 65.015 | 0.582 | | |
| 13 | −81.903 | 0.750 | 1.72916 | 54.7 |
| 14 | −104.252 | d14 | | |
| 15 (Diaphragm) | ∞ | 1.000 | | |
| 16 | 35.215 | 2.511 | 1.65001 | 50.0 |
| 17 | −10.052 | 0.750 | 1.80518 | 25.4 |
| 18 | −24.379 | d18 | | |
| 19 | 29.590 | 1.216 | 1.77250 | 49.6 |
| 20 | 86.693 | 0.250 | | |
| 21 | 7.911 | 2.850 | 1.49700 | 81.6 |
| 22 | 23617.035 | 0.750 | 1.65844 | 50.9 |
| 23 | 9.426 | 5.844 | | |
| 24 | 26.720 | 1.850 | 1.60562 | 43.7 |
| 25 | −11.774 | 1.091 | | |
| 26 | −7.533 | 0.800 | 1.80100 | 35.0 |
| 27 | −26.898 | 8.200 | | |
| 28 | ∞ | 1.050 | 1.51633 | 64.1 |
| 29 | ∞ | — | | |

TABLE 26

ZOOM LENS SYSTEM DATA
Zoom Ratio 2.94

| | Short Focal Length Extremity | Intermediate Focal Length | Long Focal Length Extremity |
|---|---|---|---|
| FNO. | 2.9 | 2.8 | 2.9 |
| f | 15.30 | 28.00 | 45.00 |
| PM | 0.000 | 0.000 | 0.000 |
| W | 18.5 | 9.8 | 6.1 |
| Y | 5.00 | 5.00 | 5.00 |
| fB | 1.00 | 1.00 | 1.00 |
| L | 70.92 | 70.92 | 70.92 |
| d5 | 4.000 | 4.000 | 4.000 |
| d7 | 1.400 | 8.516 | 11.329 |
| d14 | 14.621 | 8.515 | 0.951 |
| d18 | 3.750 | 2.741 | 7.492 |

TABLE 27

| | Close 1 w | Close 2 w | Close 3 w |
|---|---|---|---|
| PM | −0.023 | −0.024 | −0.060 |
| fB | 1.00 | 1.00 | 1.00 |
| L | 70.92 | 72.67 | 72.67 |
| d5 | 1.684 | 4.000 | 0.485 |

TABLE 27-continued

| | Close 1 w | Close 2 w | Close 3 w |
|---|---|---|---|
| d7 | 3.716 | 3.151 | 6.665 |
| d14 | 14.621 | 14.621 | 14.621 |
| d18 | 3.750 | 3.750 | 3.750 |

TABLE 28

| | Close 1 m | Close 2 m | Close 3 m |
|---|---|---|---|
| PM | −0.042 | −0.043 | −0.109 |
| fB | 1.00 | 1.00 | 1.00 |
| L | 70.92 | 72.67 | 72.67 |
| d5 | 1.684 | 4.000 | 0.488 |
| d7 | 10.832 | 10.266 | 13.779 |
| d14 | 14.621 | 14.621 | 14.621 |
| d18 | 3.750 | 3.750 | 3.750 |

TABLE 29

| | Close 1 t | Close 2 t | Close 3 t |
|---|---|---|---|
| PM | −0.068 | −0.069 | −0.175 |
| fB | 1.00 | 1.00 | 1.00 |
| L | 70.92 | 72.67 | 72.67 |
| d5 | 1.684 | 4.000 | 0.487 |
| d7 | 13.646 | 13.080 | 16.592 |
| d14 | 14.621 | 14.621 | 14.621 |
| d18 | 3.750 | 3.750 | 3.750 |

TABLE 30

LENS GROUP DATA

| Lens Group | 1$^{st}$ Surf. | Focal Length |
|---|---|---|
| 1 | 1 | 33.74 |
| 1a | 1 | 63.857 |
| 1b | 6 | 63.427 |
| 2 | 8 | −10.62 |
| 3 | 16 | 28.16 |
| 4 | 19 | 34.96 |

Numerical Embodiment 6

FIGS. 30 through 42D and Tables 31 through 37 show a sixth numerical embodiment according to the present invention. FIG. 30 shows a lens arrangement of the zoom lens system when focusing on an object at infinity at the short focal length extremity. FIGS. 31A, 31B, 31C and 31D show various aberrations that occurred in the zoom lens system of FIG. 30 at the short focal length extremity when focused on an object at infinity. FIGS. 32A, 32B, 32C and 32D show various aberrations that occurred in the lens arrangement shown in FIG. 30 at an intermediate focal length when focused on an object at infinity. FIGS. 33A, 33B, 33C and 33D show various aberrations that occurred in the lens arrangement shown in FIG. 30 at the long focal length extremity when focused on an object at infinity. FIGS. 34A, 34B, 34C and 34D show various aberrations that occurred in the zoom lens system of FIG. 30 at the short focal length extremity at a predetermined photographing distance (0.30 m) of a normal photography mode. FIGS. 35A, 35B, 35C and 35D show various aberrations that occurred in the zoom lens system of FIG. 30 at the short focal length extremity at a predetermined photographing distance (0.30 m) of a macro photography mode. FIGS. 36A, 36B, 36C and 36D show various aberrations that occurred in the zoom lens system of FIG. 30 at the short focal length extremity at a minimum photographing distance (0.18 m) of a macro photography mode. FIGS. 37A, 37B, 37C and 37D show various aberrations that occurred in the zoom lens system of FIG. 30 at an intermediate focal length at a predetermined photographing distance (0.30 m) of a normal photography mode. FIGS. 38A, 38B, 38C and 38D show various aberrations that occurred in the zoom lens system of FIG. 30 at an intermediate focal length at a predetermined photographing distance (0.30 m) of a macro photography mode. FIGS. 39A, 39B, 39C and 39D show various aberrations that occurred in the zoom lens system of FIG. 30 at an intermediate focal length at a minimum photographing distance (0.18 m) of a macro photography mode. FIGS. 40A, 40B, 40C and 40D show various aberrations that occurred in the zoom lens system of FIG. 30 at the long focal length extremity at a predetermined photographing distance (0.30 m) of a normal photography mode. FIGS. 41A, 41B, 41C and 41D show various aberrations that occurred in the zoom lens system of FIG. 30 at the long focal length extremity at a predetermined photographing distance (0.30 m) of a macro photography mode. FIGS. 42A, 42B, 42C and 42D show various aberrations that occurred in the zoom lens system of FIG. 30 at the long focal length extremity at a minimum photographing distance (0.18 m) of a macro photography mode. Table 31 shows the lens surface data. Table 32 shows various zoom lens system data when focusing on an object at infinity. Table 33 shows each lens-interval (distance) data at a predetermined photographing distance (0.30 m) in a normal photography mode at the short focal length extremity, a predetermined photographing distance (0.30 m) in a macro photography mode at the short focal length extremity, and a minimum photographing distance (0.18 m) in a macro photography mode at the short focal length extremity, respectively. Table 34 shows each lens-interval (distance) data at a predetermined photographing distance (0.30 m) in a normal photography mode at an intermediate focal length, a predetermined photographing distance (0.30 m) in a macro photography mode at the intermediate focal length, and a minimum photographing distance (0.18 m) in a macro photography mode at the intermediate focal length, respectively. Table 35 shows each lens-interval (distance) data at a predetermined photographing distance (0.30 m) in a normal photography mode at the long focal length extremity, a predetermined photographing distance (0.30 m) in a macro photography mode at the long focal length extremity, and a minimum photographing distance (0.18 m) in a macro photography mode at the long focal length extremity, respectively. Table 36 shows the aspherical surface data and Table 37 shows the lens group data of the zoom lens system.

The zoom lens system of the sixth embodiment is configured of a negative first lens group G1' and a positive second lens group G2', in that order from the object side. A diaphragm S which is provided between the first lens group G1' and the second lens group G2' moves integrally with the second lens group G2' in the optical axis direction. An optical filter OP and a cover glass CG is provided in between the second lens group G2' and the image plane I.

The first lens group G1' is configured of a negative first sub-lens group G1a' and a positive second sub-lens group G1b', in that order from the object side. The first sub-lens group G1a' is configured of a negative meniscus lens element 11' having a convex surface on the object side, a negative meniscus lens element 12' having a convex surface on the object side, and a negative meniscus lens element 13' having a convex surface on the object side, in that order from the object side. The negative meniscus lens element 11' is a hybrid lens having an aspherical layer made out of a compound resin material adhered onto the image side thereof. The second sub-lens group G1b is configured of a single positive meniscus lens element 14' having a convex surface on the object side.

The second lens group G2' is configured of a biconvex positive lens element 21', a cemented lens provided with a biconvex positive lens element 22' and a biconcave negative lens element 23'; and a biconvex positive lens element 24', in that order from the object side. Each of the biconvex positive lens element 21' and the biconvex positive lens element 24' has aspherical surfaces on both sides.

TABLE 31

SURFACE DATA

| Surf. No. | R | d | N (d) | ν (d) |
|---|---|---|---|---|
| 1 | 26.218 | 1.637 | 1.69680 | 55.5 |
| 2 | 13.873 | 0.177 | 1.52972 | 42.7 |
| 3* | 12.067 | 1.000 | | |
| 4 | 16.556 | 1.200 | 1.77250 | 49.6 |
| 5 | 8.739 | 3.611 | | |
| 6 | 520.355 | 1.200 | 1.77251 | 49.6 |
| 7 | 15.115 | 4.435 | | |
| 8 | 20.342 | 2.243 | 1.84666 | 23.8 |
| 9 | 56.198 | d9 | | |
| 10 (Diaphragm) | ∞ | 1.000 | | |
| 11* | 7.708 | 5.800 | 1.49842 | 76.7 |
| 12* | −34.307 | 0.304 | | |
| 13 | 11.901 | 2.747 | 1.49700 | 81.6 |
| 14 | −14.016 | 1.000 | 1.83400 | 37.3 |
| 15 | 9.400 | 0.435 | | |
| 16* | 17.216 | 2.266 | 1.55332 | 71.7 |
| 17* | −24.807 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

TABLE 32

ZOOM LENS SYSTEM DATA
Zoom Ratio 2.89

| | Short Focal Length Extremity | Intermediate Focal Length | Long Focal Length Extremity |
|---|---|---|---|
| FNO. | 2.8 | 3.7 | 4.6 |
| f | 5.14 | 10.01 | 14.83 |
| PM | 0.000 | 0.000 | 0.000 |
| W | 48.7 | 27.1 | 18.8 |
| Y | 5.00 | 5.00 | 5.00 |
| fB | 0.53 | 0.53 | 0.53 |
| L | 62.05 | 52.14 | 52.33 |
| d7 | 4.435 | 4.435 | 4.435 |
| d9 | 21.817 | 6.354 | 1.049 |
| d17 | 9.026 | 14.577 | 20.071 |

TABLE 33

| | Close 1 w | Close 2 w | Close 3 w |
|---|---|---|---|
| PM | −0.021 | −0.020 | −0.040 |
| fB | 0.53 | 0.53 | 0.53 |
| L | 62.05 | 62.62 | 62.62 |
| d7 | 4.816 | 4.435 | 4.795 |
| d9 | 21.437 | 22.386 | 22.026 |
| d17 | 9.026 | 9.026 | 9.026 |

TABLE 34

|     | Close 1 m | Close 2 m | Close 3 m |
|-----|-----------|-----------|-----------|
| PM  | −0.039    | −0.038    | −0.071    |
| fB  | 0.53      | 0.53      | 0.53      |
| L   | 52.14     | 52.68     | 52.68     |
| d7  | 4.801     | 4.435     | 4.755     |
| d9  | 5.988     | 6.901     | 6.581     |
| d17 | 14.577    | 14.577    | 14.577    |

TABLE 35

|     | Close 1 t | Close 2 t | Close 3 t |
|-----|-----------|-----------|-----------|
| PM  | −0.057    | −0.057    | −0.106    |
| fB  | 0.53      | 0.53      | 0.53      |
| L   | 52.33     | 52.87     | 52.87     |
| d7  | 4.801     | 4.435     | 4.756     |
| d9  | 0.682     | 1.596     | 1.276     |
| d17 | 20.071    | 20.071    | 20.071    |

TABLE 36

Aspherical Surface Data (Coefficients not shown are zero (0.00):

| Surf. No. | K     | A4          | A6          | A8          |
|-----------|-------|-------------|-------------|-------------|
| 3         | 0.000 | −0.6937E−04 | −0.1141E−06 | −0.4468E−08 |
| 11        | 0.000 | −0.8088E−04 | −0.1122E−05 |             |
| 12        | 0.000 | 0.3633E−03  | −0.7727E−05 | 0.2257E−06  |
| 16        | 0.000 | 0.6590E−03  | −0.1992E−04 |             |
| 17        | 0.000 | 0.7315E−03  | 0.2868E−05  |             |

TABLE 37

LENS GROUP DATA

| Lens Group | $1^{st}$ Surf. | Focal Length |
|------------|----------------|--------------|
| 1          | 1              | −11.97       |
| $1^{st}$ Sub | 1            | −7.51        |
| $2^{nd}$ Sub | 8            | 36.61        |
| 2          | 11             | 13.65        |

The numerical values of conditions (1) and (2) for each embodiment are shown in Table 38. Note that since the lens arrangement of numerical embodiment 6 is different from the other numerical embodiments, numerical values corresponding to condition (1) and (2) therefor cannot be calculated.

TABLE 38

|          | Num. Embod. 1 | Num. Embod. 2 | Num. Embod. 3 | Num. Embod. 4 | Num. Embod. 5 | Num. Embod. 6 |
|----------|---------------|---------------|---------------|---------------|---------------|---------------|
| Cond. (1) | 1.59         | 1.45          | 1.28          | 1.75          | 1.88          | —             |
| Cond. (2) | −2.66        | −2.62         | −2.53         | −2.70         | −2.65         | —             |

As can be understood from Table 38, the first through fifth numerical embodiments satisfy conditions (1) and (2), and as can be understood from the aberration diagrams, the various aberrations are suitably corrected.

Although the above-described first and second embodiments are described using a zoom lens system having four lens groups (a positive first lens group G1, a negative second lens group G2, a positive third lens group G3, and a positive fourth lens group G4, in that order from the object side) and two lens groups (a negative first lens group G1' and a positive second lens group G2', in that order from the object side), respectively, the present invention can be applied to various other lens arrangements.

The technical scope of the present invention cannot be bypassed by adding a lens element or lens group, which, in effect, has practically no optical power, to a zoom lens system which is included in the technical scope of the present invention.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising:
   a plurality of lens groups, wherein a specified lens group of said plurality of lens groups is a lens group which is configured to vary a distance between said lens group and an adjacent lens group upon zooming, a distance between lenses of said specified lens group not changing during zooming wherein said specified lens group of said plurality of lens groups includes a focusing lens group which is moved in the optical axis direction in a focusing operation;
   a normal photography mode in which focusing is carried out from infinity to a predetermined photographing distance by continuously moving said focusing lens group of said specified lens group in the optical axis direction; and
   a shifting mode which shifts from said normal photography mode to a macro photography mode by moving at least one lens element of said specified lens group other than said focusing lens group when focusing on an object at a photographing distance that is shorter than said predetermined photographing distance of said normal photography mode,
   wherein, when said zoom lens system is in said macro photography mode, focusing is carried out from said predetermined photographing distance to a minimum photographing distance by continuously moving said focusing lens group of said specified lens group in the optical axis direction.

2. The zoom lens system according to claim 1, wherein said specified lens group comprises a positive first lens group, which is provided closest to the object side, of said plurality of lens groups, and
   wherein said focusing lens group is provided on the image side within said first lens group.

3. The zoom lens system according to claim 2, wherein during zooming from the short focal length extremity to the long focal length extremity, said first lens group remains substantially stationary with respect to the image plane of said zoom lens system.

4. The zoom lens system according to claim 1, wherein said specified lens group comprises a negative first lens group which is provided closest to the object side, of said plurality of lens groups, and
   wherein said focusing lens group is provided on the image side within said first lens group.

5. The zoom lens system according to claim 4, wherein during zooming from the short focal length extremity to the long focal length extremity, said first lens group remains substantially stationary with respect to the image plane of said zoom lens system.

6. The zoom lens system according to claim 1, wherein, in the normal photographing mode and in the macro photographing mode, a lens group other than the focusing lens group of the specified lens group is stationary while focusing is carried out.

7. The zoom lens system according to claim 1, the shifting mode being independent of a zooming operation.

8. A zoom lens system comprising:
a positive first lens group, a negative second lens group, a positive third lens group, and a positive fourth lens group, in that order from the object side, wherein at least said second lens group and said third lens group move in an optical axis direction upon zooming from the short focal length extremity to the long focal length extremity, and wherein said first lens group includes a first sub-lens group and a second sub-lens group, in that order from the object side, said second sub-lens group constituting a focusing lens group which moves in the optical axis direction during a focusing operation;
a normal photography mode in which focusing is carried out from infinity to a predetermined photographing distance by continuously moving said second sub-lens group in an optical axis direction while said first sub-lens group remains stationary;
a shifting mode which shifts from said normal photography mode to a macro photography mode by moving both of said first sub-lens group and said second sub-lens group in the optical axis direction when focusing on an object at a photographing distance that is shorter than said predetermined photographing distance of said normal photography mode,
wherein, when said zoom lens system is in said macro photography mode, focusing is carried out from said predetermined photographing distance to a minimum photographing distance by continuously moving said second sub-lens group in the optical axis direction while said first sub-lens group remains stationary.

9. The zoom lens system according to claim 8, wherein the following condition is satisfied:

$1.2<f1b/f1G<2.0$ . . . wherein f1b designates the focal length of said second sub-lens group, and
f1G designates the focal length of said first lens group.

10. The zoom lens system according to claim 8, wherein in said normal photography mode, said second sub-lens group is moved in the optical axis direction toward said first sub-lens group, which is stationary, when focusing is carried out from infinity to said predetermined photographing distance,
wherein in said shifting mode which shifts from said normal photography mode to a macro photography mode, said first sub-lens group and said second sub-lens group mutually move away from each other in the optical axis direction, and
wherein in said macro photography mode, said second sub-lens group is moved in the optical axis direction toward said first sub-lens group, which is stationary, when focusing is carried out from said predetermined photographing distance to said minimum photographing distance.

11. The zoom lens system according to claim 8, wherein the following condition is satisfied:

$-4.0<f3G/f2G<-2.0$ . . . , wherein f3G designates the focal length of said third lens group, and
f2G designates the focal length of said second lens group.

12. The zoom lens system according to claim 8, the shifting mode being independent of a zooming operation.

13. A zoom lens system comprising a negative first lens group, and a positive second lens group, in that order from the object side, wherein a distance between said first lens group and said second lens group decreases during zooming from the short focal length extremity to the long focal length extremity, and wherein said first lens group includes a first sub-lens group and a second sub-lens group, in that order from the object side, said second sub-lens group constituting a focusing lens group which moves in the optical axis direction during a focusing operation;
a normal photography mode in which focusing is carried out from infinity to a predetermined photographing distance by continuously moving said second sub-lens group in an optical axis direction while said first sub-lens group remains stationary;
a shifting mode which shifts from said normal photography mode to a macro photography mode by moving both of said first sub-lens group and said second sub-lens group in the optical axis direction when focusing on an object at a photographing distance that is shorter than said predetermined photographing distance of said normal photography mode,
wherein, when said zoom lens system is in said macro photography mode, focusing is carried out from said predetermined photographing distance to a minimum photographing distance by continuously moving said second sub-lens group in the optical axis direction while said first sub-lens group remains stationary.

14. The zoom lens system according to claim 13, wherein upon zooming from the short focal length extremity to the long focal length extremity, said first lens group first moves toward the image side and thereafter moves toward the object side, and said second lens group monotonically moves toward the object side.

* * * * *